(12) United States Patent
Gouji et al.

(10) Patent No.: US 6,361,436 B1
(45) Date of Patent: Mar. 26, 2002

(54) FISHING GAME DEVICE

(75) Inventors: Kazuhiro Gouji; Yutaka Yokoyama; Masaru Sugahara; Junpei Sato; Yoshiharu Suzuki, all of Tokyo (JP)

(73) Assignee: Sega Enterprises, Ltd. (JP)

( * ) Notice: Subject to any disclaimer, the term of this patent is extended or adjusted under 35 U.S.C. 154(b) by 0 days.

(21) Appl. No.: 09/180,286

(22) PCT Filed: Feb. 13, 1998

(86) PCT No.: PCT/JP98/00607

§ 371 Date: Mar. 8, 1999

§ 102(e) Date: Mar. 8, 1999

(87) PCT Pub. No.: WO98/39074

PCT Pub. Date: Sep. 11, 1998

(30) Foreign Application Priority Data

Mar. 7, 1997 (JP) ............................................. 9-052633
Sep. 11, 1997 (JP) ............................................. 9-267930

(51) Int. Cl.$^7$ .................................................. A63F 9/24
(52) U.S. Cl. ............................................. 463/7; 463/31
(58) Field of Search ................................ 463/30–34, 1, 463/7, 36, 37, 47; 273/148 B

(56) References Cited

U.S. PATENT DOCUMENTS

| 5,232,223 A | * | 8/1993 | Dornbusch | 273/148 B |
| 5,542,672 A | * | 8/1996 | Meredith | 463/37 |
| 5,616,079 A | * | 4/1997 | Iwase et al. | 463/32 |
| 5,730,655 A | * | 3/1998 | Meredith | 463/37 |
| 5,734,807 A | * | 3/1998 | Sumi | 395/127 |
| 6,001,015 A | * | 12/1999 | Nishiumi et al. | 463/38 |
| 6,050,896 A | * | 4/2000 | Hanado et al. | 463/32 |

FOREIGN PATENT DOCUMENTS

| JP | 2-79 | * | 3/1990 | G09B/9/00 |
| JP | 2-79892 | * | 3/1990 | G06B/9/00 |
| JP | 7-32819 | | 4/1995 | |
| JP | 7-248723 | | 9/1995 | |

* cited by examiner

Primary Examiner—Jessica J. Harrison
Assistant Examiner—Julie Kasick
(74) Attorney, Agent, or Firm—Dickstein Shapiro Morin & Oshinsky LLP

(57) ABSTRACT

Provides a fishing game device capable of sensing operation of a fishing rod imparting action to a lure, affording more realistic simulation of tugging by the fish. Comprises a fishing rod having one end of a fishing line secured to the distal end thereof and a securing end for securing the end of the fishing line to the fishing game device, there being provided on the path of the fishing line between the fishing rod and the securing end a first slide table driven in the transverse direction such that pulling force is exerted on the fishing line in the transverse direction, a sensing unit provided to the first slide table for sensing the vertical and sideways orientation of the fishing rod, a vibrating unit for imparting finely graduated movements to the fishing line, a fishing line slack take-up unit supporting in spring fashion a fishing line guide so as the keep the fishing line constantly taut, and a second slide table driven in the longitudinal direction such that pulling force is exerted on the fishing line in the longitudinal direction.

21 Claims, 34 Drawing Sheets

Moves eccentric roller 30 sideways

Moves fishing line 31, 32 sideways

Moves fishing line gides 31, 32 up and down

| 0 | 20 | 40 | 60 | 80 | 100 |
|---|----|----|----|----|-----|
| 1 | 2  | 3  | 4  | 5  |     |

| Activity | 1 | 2 | 3 | 4 | 5 |
|---|---|---|---|---|---|
| Maximum speed m/sec | 0.2 | 0.6 | 1 | 2 | 3 |

| Activity value | 0~30 | 31~70 | 71~100 |
|---|---|---|---|
| Status of fish | Nervous and cautious | Normal | Hungry and excited |

FIG. 21

| Fish No. | Activity | Appropriate lure | Inappropriate lure | Appropriate action | Inappropriate action |
|---|---|---|---|---|---|
| 1 | 5 | A, B | D, | a | d |
| 2 | 3 | C, D | | c | |
| 3 | 2 | D, E | A, B | d | a |
| 4 | 5 | A, B | D | a | d |
| 5 | 1 | F, G | S, A | f | s |
| 6 | 3 | C, D | | c | |
| ⋮ | ⋮ | | | | |

FIG. 22A

Spiner

| Lure action | | Activity value 0-30 (nervous) | 31-70 (normal) | 71-100 (excited) |
|---|---|---|---|---|
| Lure reaches the surface of the water | Activity | Ignore:swims away = 5 : 5 | Turns towards lure | Turns towards lure |
| | Activity value | △△ | ○ | ○ |
| | Bite flag | △ | ○ | ☆○ |
| Pose | Activity | Ignore | Swim towards lure | Swim towards lure |
| | Activity value | ○ | △ | △ |
| | Bite flag | ○ | □ | □ |
| First retrieval | Activity | Ignore:swims away = 5 : 5 | Chases lure | Chases lure |
| | Activity value | △△ | ○ | ○○ |
| | Bite flag | △ | ○ | ☆○○ |
| ⋮ | | | | |
| ⋮ | | | | |

△  minus

○  plus

□  ±0

☆  Trigger action bite

FIG. 22B

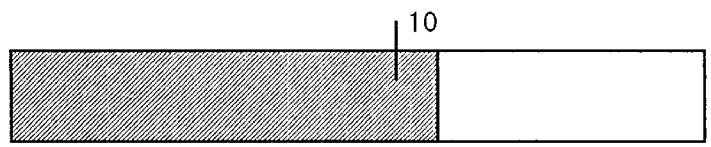

FISHING GAME DEVICE

BACKGROUND OF THE INVENTION

1. Field of the Invention

The present invention relates to a fishing game device, and more particularly to a fishing game device that allows the user to readily enjoy a simulated fishing experience integrated with images of fishing shown on a display unit.

2. Description of the Related Art

Game devices that allow one to experience simulations of the various little pleasures of life by means of electronic devices, such as driving games, combat games, Japanese chess games, surfing games, and other such game devices, are in widespread use. Fishing games of various designs have also been proposed.

For example, Unexamined Patent Application Kokai 2-79892 teaches a simulated fishing game device. In the technology disclosed therein, the experience of tugging by the fish is simulated by drawing the end of a fishing line onto a reel attached to a reel motor while using an orbiting arm driven by a motor to simulate sideways motion of the fish, allowing one to experience fishing indoors.

In actual fishing, particularly lure fishing, movement of the fishing pole, which imparts the desired action to the lure, is an extremely important element. Tugs produced by an actual fish vary multidirectionally in timing. Selection of the proper lure for the fishing location also has considerable impact on the fishing outcome. Accordingly, it is important for a fishing game to allow the player to vary the lure in accordance with the fishing location environment.

Thus, any game device having a lure fishing theme must be capable of sensing manipulation of the fishing pole with the intent of imparting action to the lure so that more realistic fish behavior can be simulated. The fishing simulator device taught in Unexamined Patent Application Kokai 2-79892, however, employs only two servo motors to simulate tugging by the fish.

Another important element of actual fishing is the subtle motion produced by the fish nibbling on the bait before it actually becomes caught on the hook. The reel motor taught in the aforementioned publication, however, simply places load on the fishing line.

Since the fishing device will be used by some large unspecified number of players, the device should have simplicity of design and ease of maintenance.

The simulated fishing device taught in the aforementioned publication cannot reproduce the subtle motion produced by the fish nibbling on the bait, simulated pulling by the fish becomes rather monotonous. Pulling by the fish is simulated by attaching to a drum a line that is not connected to the fishing rod and then turning the drum, and thus when the line becomes slack around the outside of the drum it can become entangled, possibly causing the line to break.

Nor does the aforementioned publication teach selection of bait, lure, or other elements, and accordingly lacks the interest of real lure fishing. Game development in the conventional fishing device progresses in substantially unvarying fashion, allowing the player to anticipate the size and location of the fish after playing the game a few times. The motivation to catch ever larger fish is thus lost, so that the player loses interest in the fishing game machine.

SUMMARY OF THE INVENTION

Accordingly, it is an object of the present invention to provide a fishing game device that gives the player an experience closely resembling actual lure fishing, and that has a simple design accommodating use by a large unspecified number of players.

It is a further object to provide a fishing game device that allows the player to make proper selection of the lure for the fishing location, and that provides to the player an experience which closely resembles the actual fishing experience, in which fish migrate in response to wind direction and water temperature at real-world fishing locations and in which fish that are not caught grow over time to become bigger fish.

According to the present invention, the aforementioned objects are achieved through the following means.

Specifically the first composition of a game fishing device according to the present invention comprises a fishing rod having one end of a fishing line secured to the distal end thereof, a securing end securing the other end of the fishing line, a first drive mechanism for imparting transverse pulling force to the fishing line along the path of the fishing line between the fishing rod and the securing end, and a second drive mechanism for imparting longitudinal pulling force to the fishing line along the path of the fishing line between the fishing rod and the securing end.

The side to side movement of the first drive mechanism and the back and forth movement of the second drive mechanism impart to fishing rod having the fishing line secured to the distal end thereof fish pulling force that moves side to side and back and forth.

The second composition of a game fishing device according to the present invention, in addition to the first composition, further comprises a vibrating unit for imparting finely graduated motion to the fishing line along the path of the fishing line between the first drive mechanism and the securing end, and a slack uptake unit for taking up slack in the fishing line.

Accordingly, small vibrating motions are imparted to the fishing line by the vibrating unit for imparting finely graduated motion to the fishing line, providing a sensation which closely approximates the real fishing experience. The slack uptake unit keeps the fishing line constantly taut with respect to the fishing rod, affording the player the simulated experience of manipulating a lure.

The first and second drive mechanisms of the present invention are provided with a slide table capable of moving in the direction in which force will be applied to the fishing line, and with a slide rail for regulating the direction of motion of the slide table. Thus, the drive mechanism that produces the fish tugging simulation moves in linear fashion, reducing the incidence of line tangling compared to the rotating drum design of the prior art.

The third composition of a game fishing device according to the present invention further comprises a sensing unit provided to the sliding table of the first drive mechanism for sensing the vertical and sideways orientation of the fishing rod. Since the fishing rod position can be sensed by the game device unit, the fishing rod can be made lighter.

The design of the sensing unit specifically comprises a sliding plate furnished with a hole in the center thereof through which the fishing line passes, and a sensor disposed in proximity to the slide plate for sensing the direction and/or the amount of motion of the slide plate.

Accordingly, fishing line position and fishing pole orientation can be determined through slide plate motion sensed by the sensor.

This composition allows both vertical and sideways motion to be sensed using a single sensing unit, affording simplicity of design and ease of adjustment. Since motion detection takes place at the location on the unit closest to the fishing rod, subtle movements of the fishing rod can be detected.

The slide table of the second drive mechanism comprises a pivoted rotating member, a fishing line guide attached to the other end of the rotating member and engaging the fishing line, and a spring member attached to the rotating member for imparting restoring force in opposition to tugs on the fishing line. Thus, snapping of the fishing pole and breaking of the fishing line are prevented in the event that the fishing rod is vigorously swung about.

The rotating member can be secured to the cabinet. This allows the slide table to be made lighter and affords a simple design, improving response characteristics.

The aforementioned vibrating unit specifically comprises two fishing line guides which engage the fishing line, an eccentric roller whose side face contacts the fishing line stretched between the two fishing line guides, and a motor for turning the eccentric roller. This makes it possible to produce subtle movements simulating nibbling at the baited hook by the fish prior to becoming caught on the hook.

By changing the speed of rotation of the eccentric roller, the frequency of vibration imparted to the fishing line by the vibrating unit can be altered. By controlling the intensity and frequency of vibration applied to the fishing line, it is possible to simulate the resistance produced by fish of different sizes and to simulate different numbers of fish nibbling on the bait.

The vibrating unit can modify the stroke of fishing line motion by moving the eccentric roller from side to side, making possible simulation of the fish taking the bait and pulling on the line, or simply nibbling at the bait.

The vibrating unit can also modify the stroke of fishing line motion by moving from side to side the fishing line guide through which the fishing line is passed. Thus, the effects described above may be realized through a simple structure in which the fishing line guide are simply moved from side to side.

The vibrating unit can also modify the stroke of fishing line motion by moving one or two fishing line guides towards and away from the eccentric roller. According to this invention, the length of the fishing line drawn in by the eccentric roller and the acceleration of fishing line movement can be varied, allowing vibration to be modified according to numerous variations.

The aforementioned slack uptake unit comprises stationary first and second fishing line guides, and a movable third fishing line guide for guiding the fishing line along the path of the fishing line suspended between the first and second fishing line guides. Slack in the fishing line can be taken up through the constant application of pulling force to the fishing line by the movably supported fishing line guide.

In lure fishing, the fishing rod is moved incrementally to impart action to the lure; in the design described here the fishing line is maintained constantly taut in response to movement of the fishing rod, providing a more realistic simulation of the experience of manipulating a lure.

The composition of the slack uptake unit specifically comprises a rotating element having the third fishing line guide attached to one end thereof and being pivoted at the other end, and a spring member attached to the rotating member for imparting restoring force to the spring member in opposition to pulling force exerted on the fishing line. The fishing line is kept constantly taut by the spring member, allowing slacking in the fishing line to be taken up.

Providing the spindle of the rotating member with an encoder or volume allows the slack uptake unit to ascertain through displacement thereof the amount of motion of the fishing rod.

An alternative composition of the slack uptake unit comprises a slide table, movable in the direction in which pulling force is applied to the fishing line, on which the third fishing line guide is mounted, a slide rail for limiting the direction of motion of the slide table, and an a spring member attached to the slide table for imparting restoring force to the slide table in opposition to pulling force exerted on the fishing line.

This design allows slack in the fishing line to be taken up in the manner described above, and since the component is similar to the slide tables of the first and second drive mechanisms, parts can be made interchangeable and maintenance can be facilitated.

According to the invention disclosed herein, the first drive mechanism, which applies pulling force to the fishing line in the transverse direction, can be optionally omitted. In this case, the sensing unit will be stationary and it will not be possible to simulate pulling by the fish in the transverse direction, but this is compensated for by greatly simplified structure and greater ease of maintenance.

In another aspect, the fishing game device of the present invention provides a fishing game device comprising a display unit, a control unit for converting into two-dimensional coordinates data for objects having three-dimensional coordinates in a three-dimensional virtual space and controlling the display of images of these objects on the display unit, and a simulated fishing rod manipulated by the player, wherein images of the objects shown on the display are updated in response to movements of the simulated fishing rod, further comprising a sensing element for sensing movements of the simulated fishing rod manipulated by the player, wherein the control unit establishes a camera viewpoint on the basis of a specific relationship to the coordinates of the object in a three-dimensional coordinate system and controls the display unit so as to display image data produced through projection of the object, as viewed from the camera viewpoint, onto a two-dimensional plane, and wherein the object coordinates and camera viewpoint coordinates maintained in a specific relationship to the object coordinates are updated in response to movements of the simulated fishing rod sensed by the sensing element.

Accordingly, fish movement during the game can be controlled through detection of subtle movements of the fishing rod manipulated by the player, fish data stored in a memory component or the like within the device can be varied with time, and the camera viewpoint from which images of the lure and the like shown on the display unit are viewed can be altered in response to movements of the fishing rod sensed by the sensing element, giving the player an experience which closely approximates actual lure fishing.

Other features and objects of the present invention will become apparent from the following description of the preferred embodiments referring to the accompanying drawings.

BRIEF DESCRIPTION OF THE DRAWINGS

FIG. 21 is an illustrative diagram of fish attribute parameters in an embodiment of the present invention;

FIGS. 22A and 22B are illustrative diagrams showing relationships among lure action, activity values, and bite flags in an embodiment of the present invention;

DESCRIPTION OF THE PREFERRED EMBODIMENTS

Figure 1:
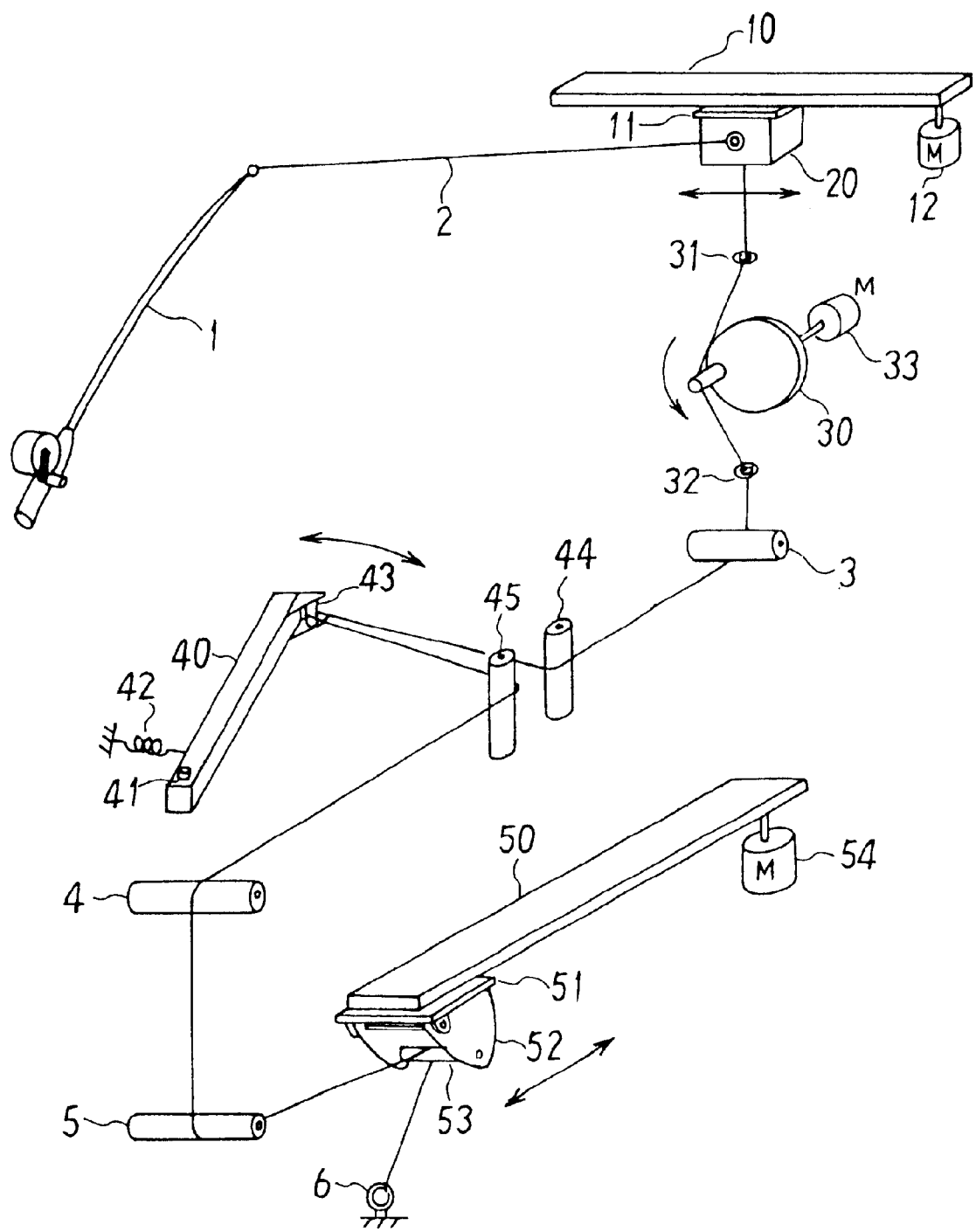
FIG. 1 is a simplified structural diagram of an embodiment of the present invention in its entirety.

Embodiments of the present invention will be described below referring to the accompanying drawings. Identical or similar elements in the drawings have been assigned identical reference numbers and symbols. The embodiments described here should not be construed to limit the technological scope of the invention.

Embodiments of fishing game devices in accordance with the present invention are of the type intended for installation in game arcades and the like, and comprise a monitor device for displaying images of fishing and a cabinet for accommodating the control boards that control the whole fishing game. First, a description of the mechanical components of embodiments of the present invention will be provided.

FIG. 1 is a simplified structural diagram of an embodiment of the present invention in its entirety. The fishing rod 1 is not affixed to the game device, allowing it to be freely manipulated by the player in a manner similar to actual fishing. A fishing line 2 is secured to the distal end of the fishing rod 1, the fishing line 2 being inserted into a sensing unit 20 that will be described shortly. A transverse mechanism 10-20 simulates transverse movement by the fish. A slide table 11 is driven along a slide rail 10 by a motor 12.

A sensing unit 20 capable of sensing the vertical and sideways orientation of the fishing rod 1 is mounted on the first sliding table 1.

A vibrating unit 30-33 provides fine incremental motion to the fishing line 2. An eccentric roller 30 contacts the fishing line 2 stretched between fishing line guides 31 and 32, the eccentric roller 30 being driven by a motor 33. This will be discussed in greater detail shortly.

Fishing line guides 3–5 deflect the path of the fishing line 2. A slack uptake unit 40-45 is secured in a manner described in detail shortly. Between fishing line guides 44 and 45 there is provided a fishing line guide 43 for imparting pulling force to the fishing line 2. The fishing line guide 43 is secured to one end of a bar element 40 movably supported at the other end thereof about a fulcrum 41 and urged by spring force provided by a spring 42.

Also provided is a longitudinal mechanism 50-54, described in detail later, for simulating longitudinal movement by the fish. The mechanism comprises a second slide table 51 driven along a second slide rail 50 by means of a motor 54, and a roller member 52 attached to the second slide table 51 for dissipating strong tugs on the fishing line 2. A fishing line guide 53 is secured to the roller member 52, and the end of the fishing line 2 tied to a securing component 6 located on the device.

For a fishing game device, particularly a fishing game with a lure fishing theme, it is important that manipulation of the fishing rod to produce lure action be sensed rapidly in order that reproduction of pulling by the fish can be made more realistic.

In the fishing game device of the present invention, the position of the fishing rod 1 is readily sensed by the sensing unit 20, allowing vertical and sideways motion of a fish to be simulated by means of the transverse and longitudinal mechanisms. The subtle vibration imparted to the fishing line 2 by the vibrating unit 30 conveys to the hands grasping the fishing rod a sensation similar to the resistance encountered with a swimming fish. The fishing line 2 is kept constantly taut with respect to the fishing rod 1 by means of the slack uptake unit 40, providing a more realistic sensation of manipulating lure movement.

Figure 2:
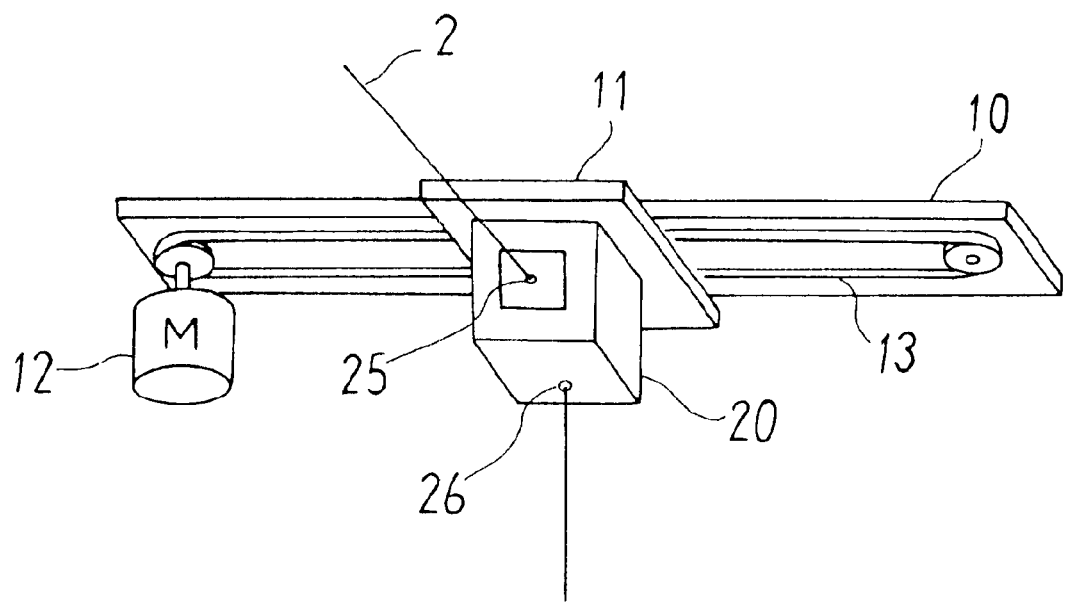
FIG. 2 is a simplified structural diagram of the transverse mechanism of the embodiment of FIG. 1.

FIG. 2 is a simplified structural diagram of the transverse mechanism. The first slide table 11 is movably mounted on a first slide rail 10 and is driven in the transverse direction through the agency of a belt 13 by means of a motor 12 attached to the end of the slide rail 10. The first slide table 11 has mounted thereon a sensing unit 20, described in detail shortly. The fishing line 2 enters the sensing unit 20 through a hole 25 on the front face thereof and emerges from a hole 26 located on the bottom face thereof. The transverse mechanism is capable of simulating motion of a fish in the transverse direction. While the present embodiment describes a motor belt drive employed as the drive mechanism, a ball-screw drive, linear motor drive, or an air mechanism employing a rodless cylinder would also be possible.

Figure 3:
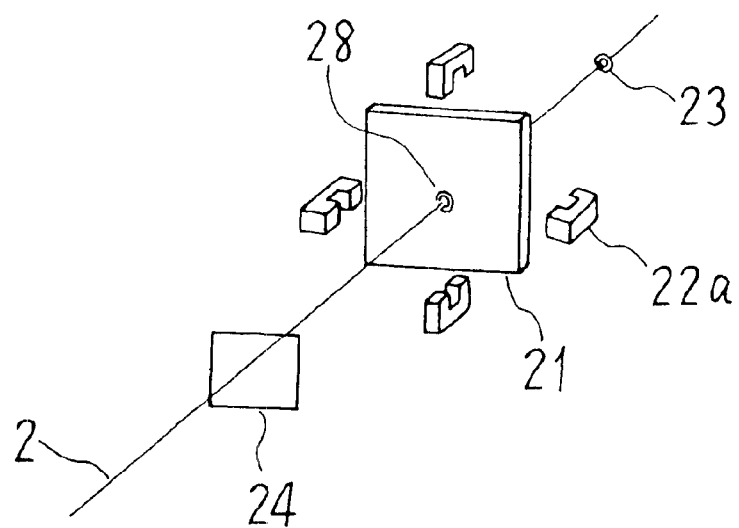
FIG. 3 is a simplified structural diagram of the sensing unit of the embodiment of FIG. 1.

FIG. 3 is a simplified structural diagram of the sensing unit. The direction of motion of a slide plate 21 is limited to vertical and sideways motion with reference to the sensing unit 20 by means not depicted in the figure. In the central portion of the slide plate 21 there is provided a hole 28 of a diameter slightly larger than the diameter of the fishing line 2. Thus, the fishing line 2 can pass freely through the slide plate 21. A fishing line guide A23 and a fishing line guide B24 are arranged at the front and back of the slide plate 21, with the fishing line guide B24 located on the side facing the fishing rod 1 grasped by the player. Fishing line guide A23 and a fishing line guide B24 are fastened securely to the sensing unit.

Fishing line guide B24 has a square shape allowing the fishing line 2 to move vertically and sideways. The size thereof is selected with reference to the scope of vertical and sideways motion of the fishing rod 1 and the distance from the fishing rod 1 to the sensing unit 20. Fishing line guide A23, on the other hand, has a hole with a diameter slightly larger than the diameter of the fishing line 2 so that the fishing line 2 can pass freely through it. Thus, when the player swings the fishing rod 1 to the right, the fishing line 2 moves to the right side of the fishing line guide B24, causing the slide palter 21 to move to the right.

Position sensors 22a are arranged above and below and to the sides of the slide plate 21; by sensing the motion of the slide plate 21, the position of the fishing line 2 and the orientation of the fishing rod 1 can be ascertained.

By means of the sensing unit 20 according to the present invention, vertical and sideways motion can be detected by means of a simple slide plate 21, affording a simple mechanism and easy maintenance. The position sensors 22a may comprise optical position sensors or the like, as shown in FIG. 3.

Figure 4:
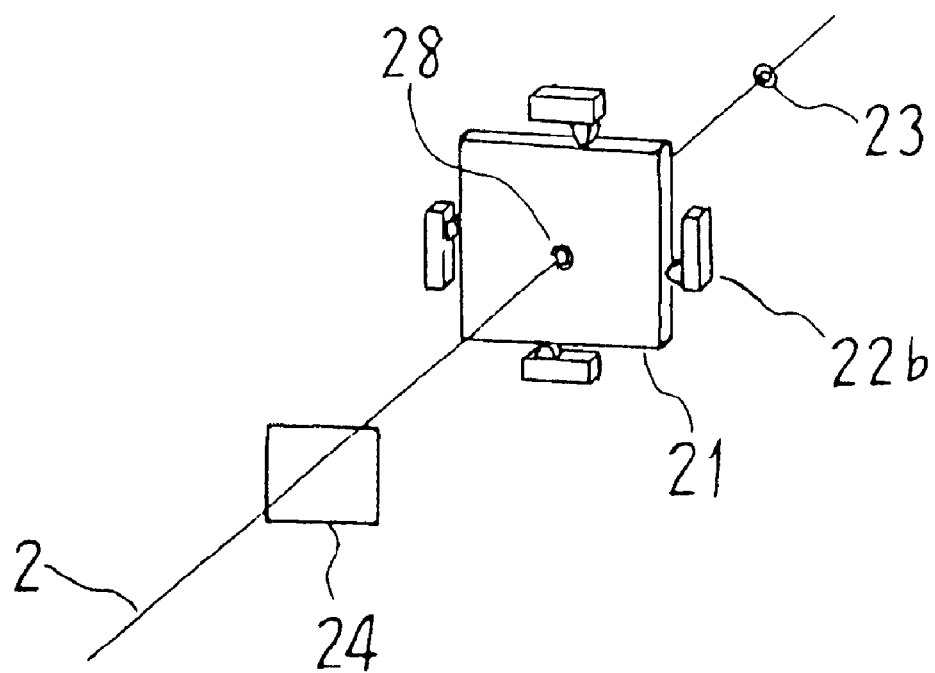
FIG. 4 is an alternative simplified structural diagram of the sensing unit of the embodiment of FIG. 1.

Microswitches 22b can also be used as the position sensors 22a, as shown in FIG. 4. In this design the slide plate 21 is centered by the microswitches 22b themselves, providing an even more simple sensing unit mechanism.

Figure 5:
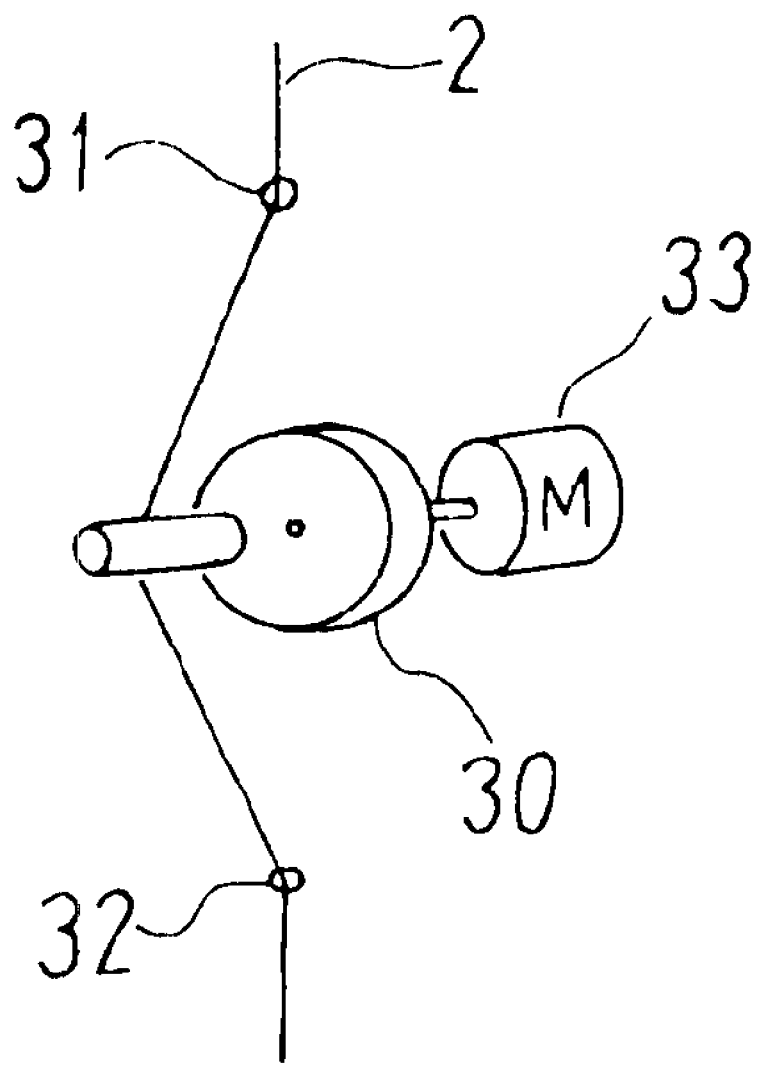
FIG. 5 is a simplified structural diagram of the vibrating unit of the embodiment of FIG. 1.

FIG. 5 is a simplified structural diagram of the vibrating unit. The fishing line 2 passing between fishing line guides 31 and 32 secured to the fishing game device is maintained in a taut state by the aforementioned longitudinal mechanism. The eccentric roller 30 has a rod-shaped projection 34 that contacts the fishing line 2, and is turned by a motor 33.

Thus, by turning the eccentric roller 30, the fishing line 2 can be made to move incrementally in the vertical direction. This motion, when transmitted to the fishing rod 1, provides an experience similar to the sensation of hooking a fish.

In this design, variation can be introduced into the vibration mode by varying the speed of rotation of the motor 33. This allows for simulation of differences in resistance by fish of different sizes, and of the sensation of a "bite" as the fish takes the bait.

Figure 6A:
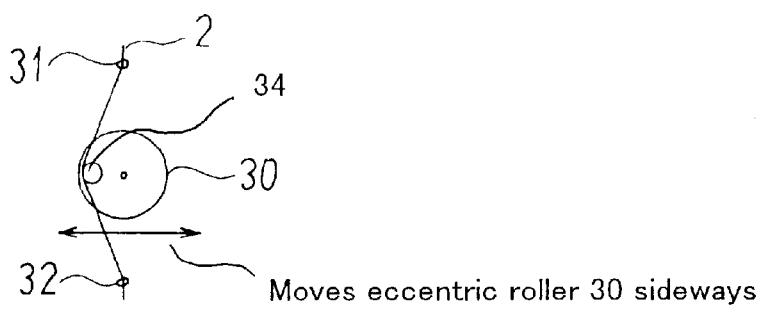
FIGS. 6A through 6C are simplified structural diagrams depicting examples of practice of the vibrating unit of the embodiment of FIG. 1.
Figure 6B:
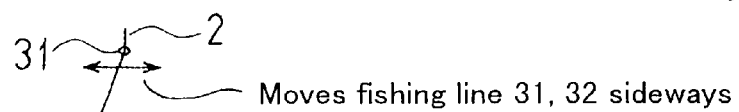
Figure 6C:
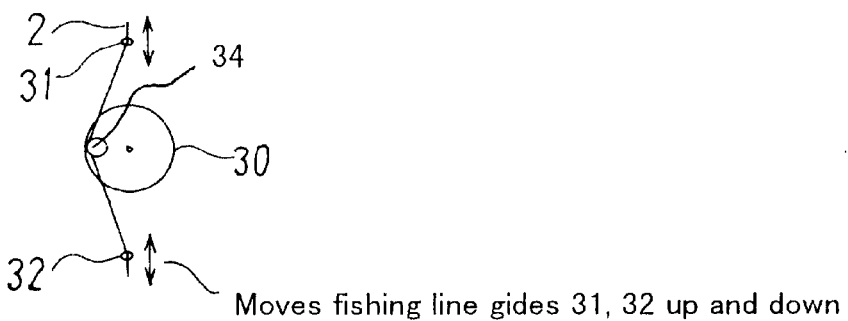

FIGS. 6A through 6C depict examples of practice of the vibrating unit. In the design shown in FIG. 6A, the eccentric roller 30 is moved sideways by a motor or solenoid (not shown), allowing the stroke of motion of the fishing line 2 to be varied. Specifically, by establishing small sideways displacement for the eccentric roller 30 so that the rod-shaped projection 34 of the eccentric roller 30 contacts the fishing line 2 exclusively at the point closest to the fishing line 2, a short stroke of motion of the fishing line 2 can be produced. Conversely, by moving the eccentric roller 30 to the left so that the rod-shaped projection 34 contacts the fishing line 2 over most angles during rotation of the eccentric roller 30, a long stroke of motion of the fishing line 2 can be produced.

This makes it possible to control the intensity of sensation transmitted to the hands grasping the fishing rod, creating the impression of fish of different sizes taking the bait or simulating the sensation produced by the lure hitting an obstacle.

In FIG. 6B, the position of the eccentric roller 30 is stationary, while fishing line guides 31 and 32 move sideways. The effect is analogous to that described above.

In FIG. 6C, the position of the eccentric roller 30 is stationary, while one or both of the fishing line guides 31 and 32 move closer to or away from the eccentric roller 30. This allows the stroke of motion of the fishing line to be varied, producing a effect analogous to that described above.

Figure 7:
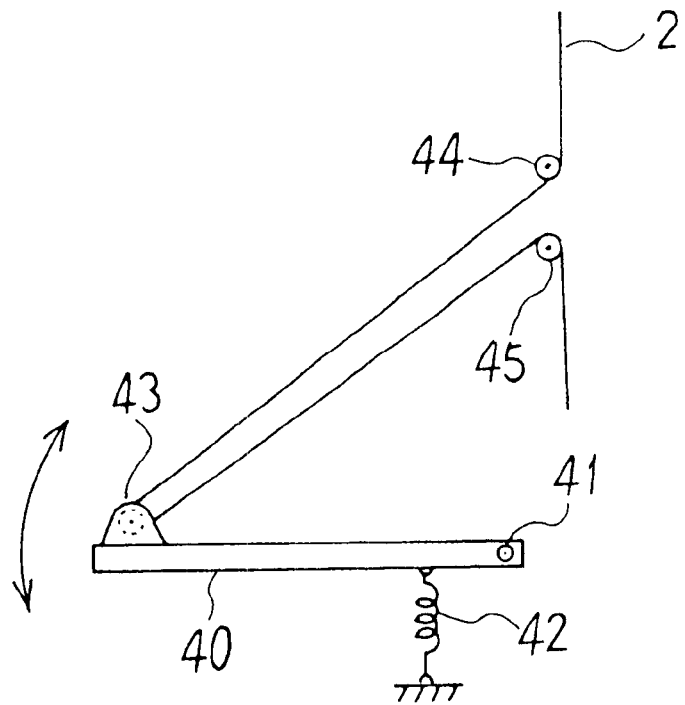
FIG. 7 is a simplified structural diagram of the slack uptake unit of the embodiment of FIG. 1.

FIG. 7 is a simplified structural diagram of the slack uptake unit. It comprises stationary fishing line guides 44 and 45 and a bar-shaped element 40, one of which is movable about a fulcrum 41 and the other end of which has a fishing line guide 43 secured thereto. The bar-shaped element 40 is supported at its center by a spring 42 or similar spring element. As shown in the drawing, the fishing line 2 is threaded through the fishing line guides 43, 44, and 45 and is thus constantly maintained in a taut state.

In lure fishing, the fishing rod 1 is moved incrementally to impart action to the lure. In the fishing game device according to the present invention, the fishing line 2 is maintained constantly taut in response to movement of the fishing rod 1, thereby allowing slight movements of the lure to be transmitted to the hands grasping the fishing rod 1 and providing a more realistic simulation of the experience of manipulating a lure.

By providing the fulcrum 41 with an encoder or volume, the amount of motion of the fishing rod 1 can be ascertained through the displacement thereof.

Figure 8:
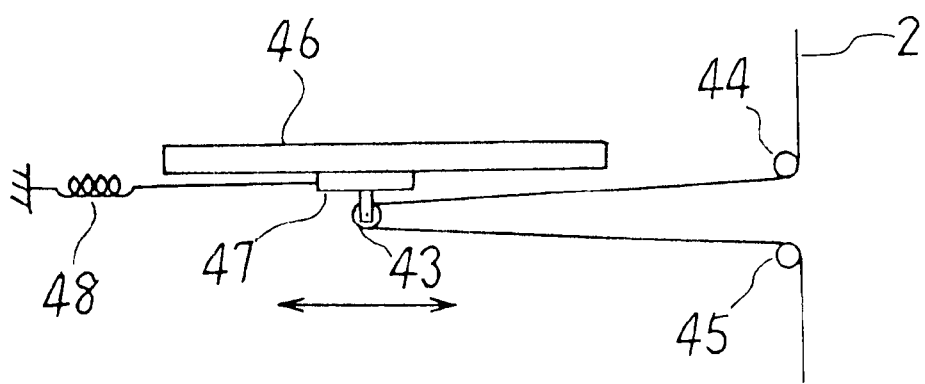
FIG. 8 is a simplified structural diagram depicting an example of practice of the slack uptake unit of the embodiment of FIG. 1.

FIG. 8 depicts another specific example of the slack uptake unit. Positional relationships of the fishing line guides 43, 44, and 45 are analogous to those in the example of FIG. 7. A third slide table 47 is arranged movably along a third slide rail 46, and the fishing line guide 43 is secured to the third slide table 47. Since the third slide table 47 is linked to a spring element such as a spring 48, the fishing line 2 is constantly maintained in a taut state.

This linear design provides effects analogous to those of the example of FIG. 7. By using as the slide rail 46 and the slide table 47 parts that are interchangeable with those of the longitudinal mechanism, the mechanism can be simplified and maintenance can be facilitated.

Figure 9:
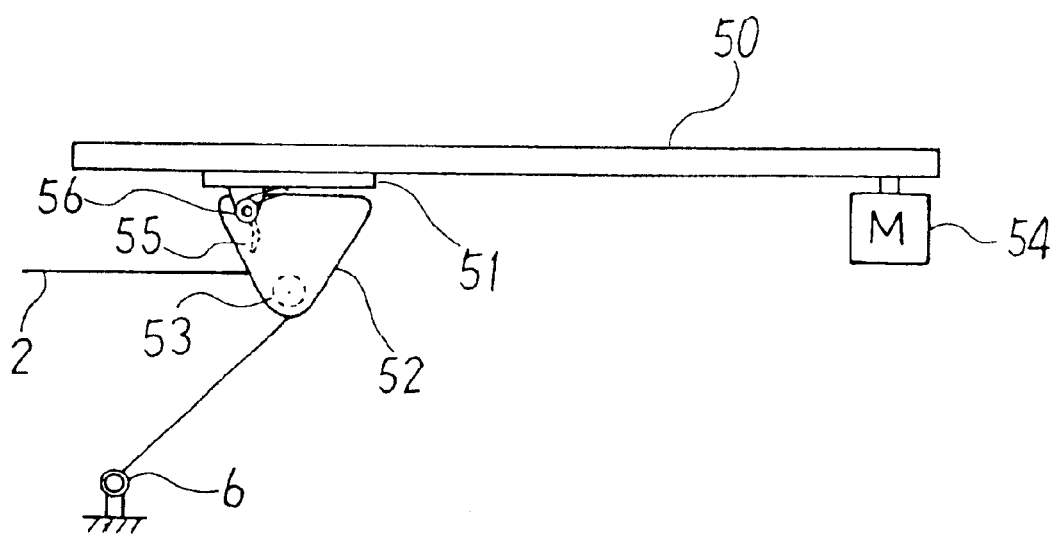
FIG. 9 is a simplified structural diagram of the longitudinal mechanism of the embodiment of FIG. 1.

FIG. 9 is a simplified structural diagram of the longitudinal mechanism. A second slide table 51 is driven along a second slide rail 50 by a motor 54. The second slide table 51 has a roller member 52 that is rotatably attached thereto about a fulcrum 56 and that is urged against the second slide table by a spring 55 or other spring element. A fishing line guide 53 is attached to one end of the roller member 52. The fishing line 2 is threaded around the fishing line guide 53 and is then secured to the securing component 6 of the fishing game device.

The longitudinal mechanism employs a direct drive system analogous to that of the transverse mechanism and is capable of simulating tugging by a fish. The roller member 52 around which the fishing line 2 is threaded is urged against the second slide table 51 by a spring 55, but will rotate about the fulcrum 56 when tensile force exceeding the spring force of the spring 55 is applied. This prevents snapping of the fishing rod 1 when swung vigorously or breaking of the fishing line 2.

Figure 10:
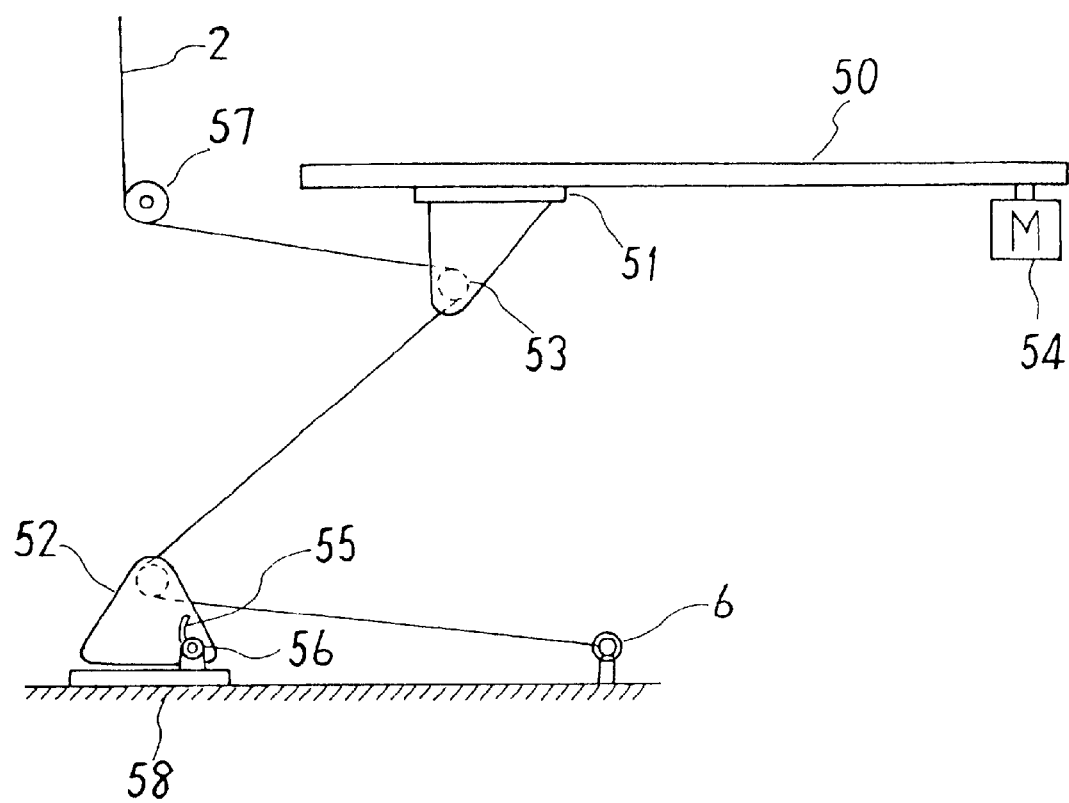
FIG. 10 is an alternative simplified structural diagram of the longitudinal mechanism of the embodiment of FIG. 1.

FIG. 10 depicts an embodiment in which the roller member 52 is secured to the cabinet wall 58. In this design, the roller member 52 functions analogously to the design depicted in FIG. 9. The slide table 51, which bears the fishing line guide 53, is lightweight and is of simple construction, improving the response to fish pulling force.

Figure 11:
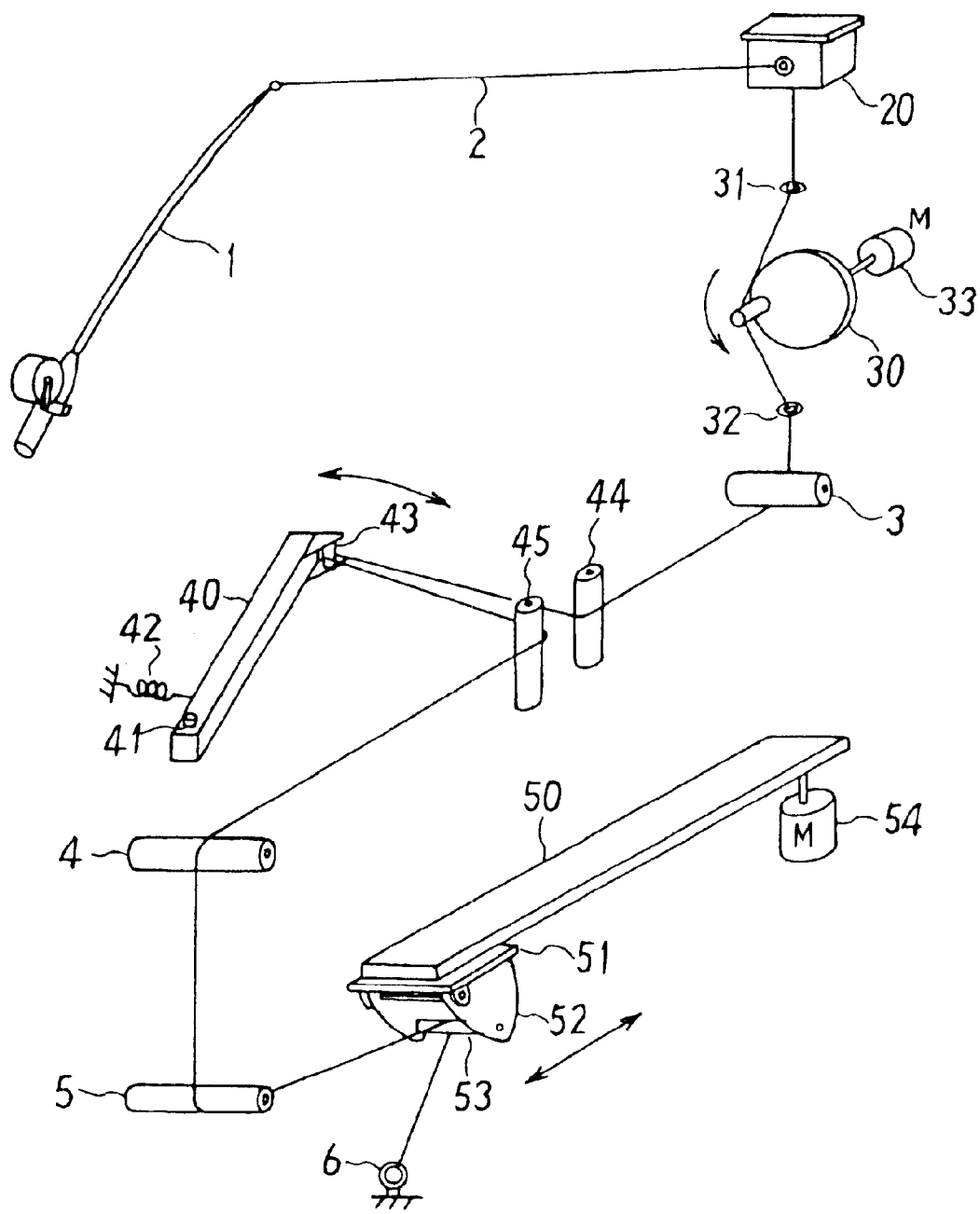
FIG. 11 is an example of the sensing unit secured to the cabinet in the embodiment of FIG. 1.

FIG. 11 depicts an embodiment of the invention wherein the sensing unit 20 is affixed to the cabinet of the fishing game device. In this design, pulling by the fish in the transverse direction cannot be simulated, but the simpler mechanism affords easier adjustment and maintenance.

The control operation employed in an embodiment of a fishing game device of the present invention that including the structural elements depicted in FIGS. 1 through 11 will be described referring to FIGS. 12 through 36. FIGS. 1 through 11 will be referred to where necessary.

Figure 12:
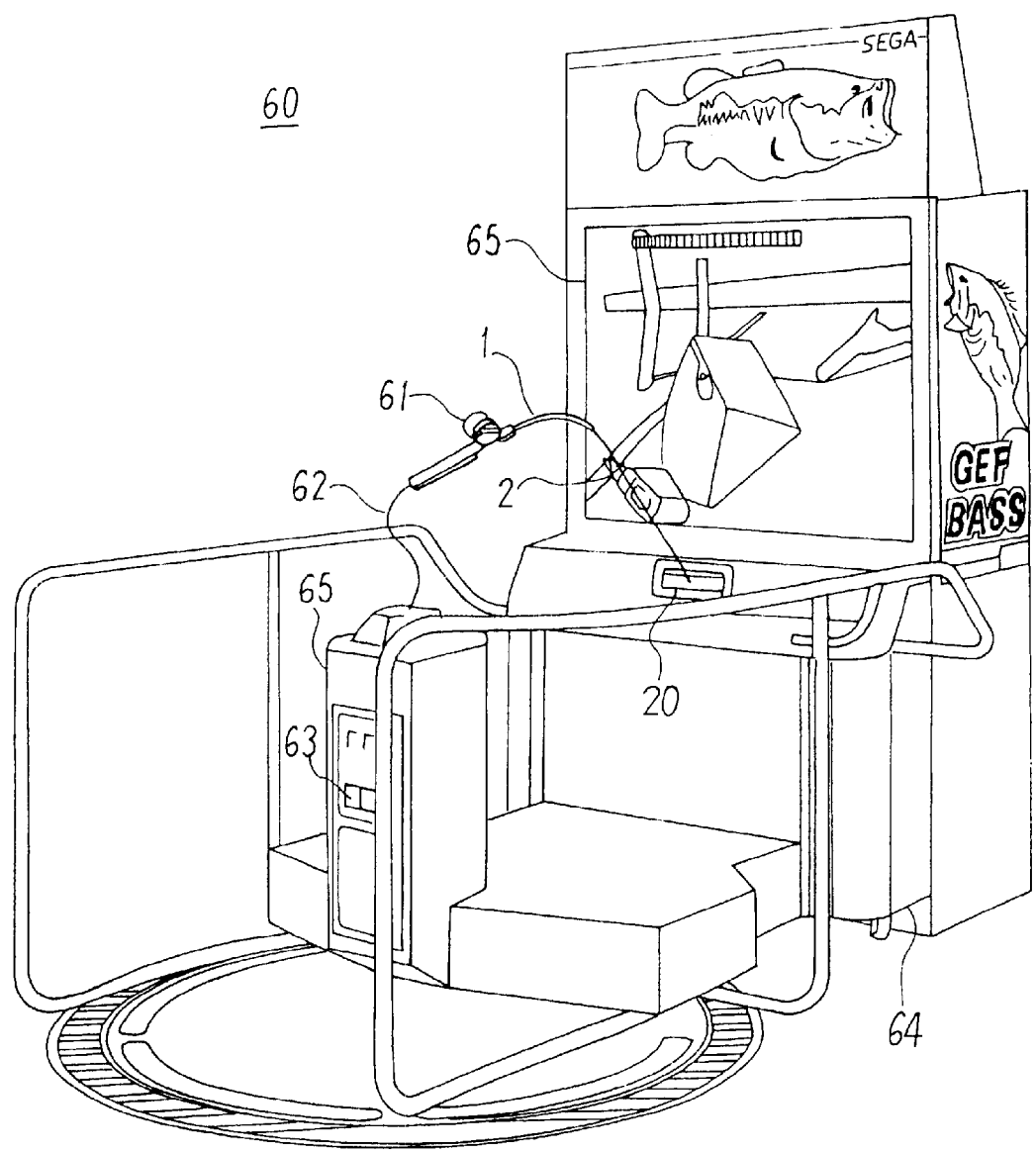
FIG. 12 is an exterior perspective view of the embodiment of FIG. 1.

FIG. 12 is an exterior perspective view of a fishing game device 60 pertaining to an embodiment of the present invention. A fishing line 2 secured to the distal end of a fishing rod 1 is passed through a sensing unit 20 provided to the cabinet 64 (see FIG. 1), with motion simulating pulling force by a fish being applied thereto by the aforementioned transverse mechanism 10 and longitudinal mechanism 50. A dummy fishing line extends between the distal end of the fishing rod 1 and the reel 61 to give the player the visual impression that the fishing line 2 can be reeled in by turning the reel 61.

The fishing rod 1 and the cabinet 65 are connected by a cable 62 for transmitting signals indicating the number of turns of the reel 61 and signals for applying resistance to the reel 61 to simulate that a fish has been caught. The cabinet 65 is also provided with a coin slot 63. The fishing game begins when a player inserts a coin through the coin slot 63. To play the fishing game, the player operated the fishing rod 1 and the reel 61 while viewing a projection television 65.

Figure 13:
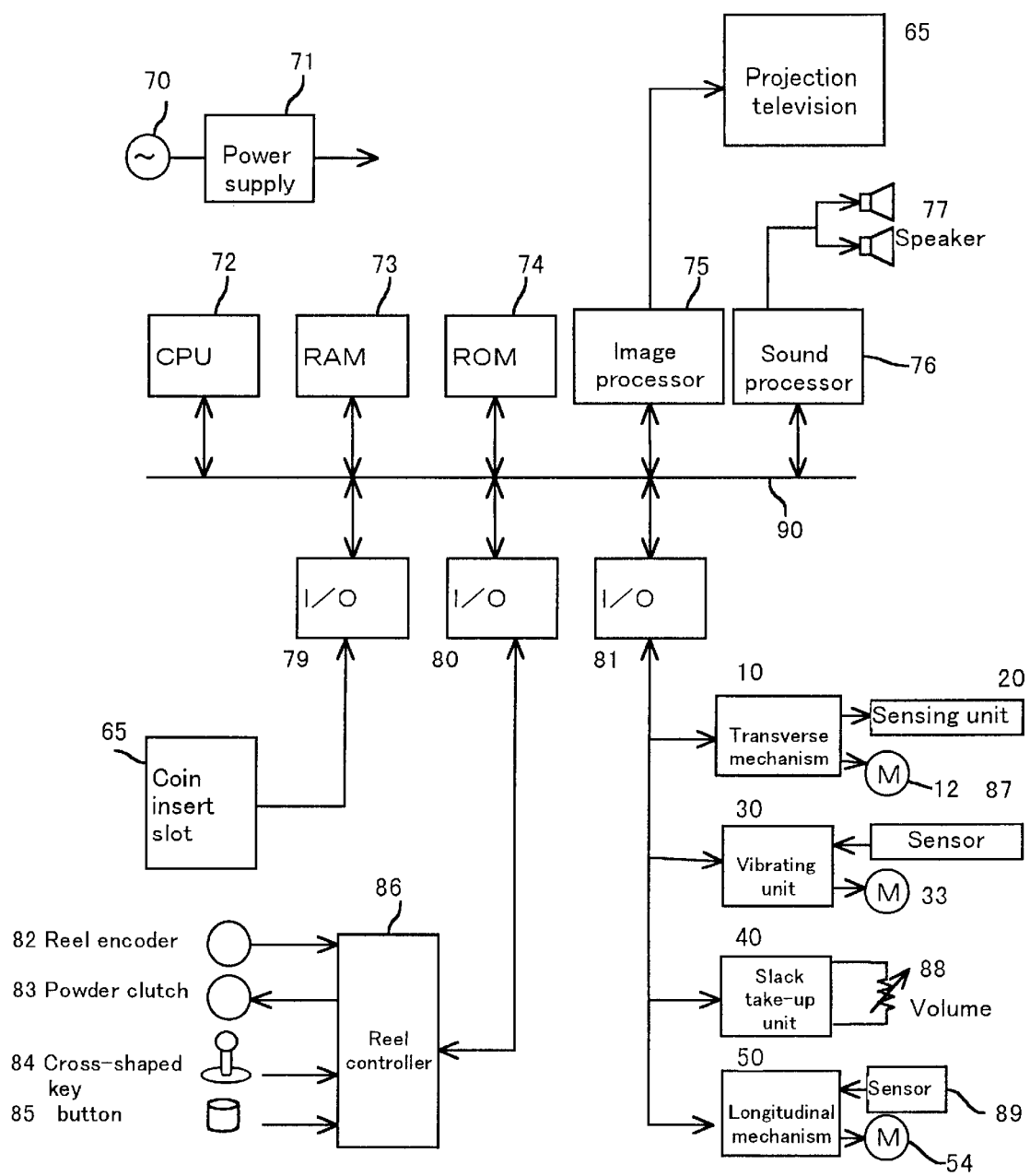
FIG. 13 is a circuit block diagram of an embodiment of the fishing game device of the present invention.

FIG. 13 is a control block diagram of an embodiment of the fishing game device of the present invention. The alternating current from an alternating current power source 70 is converted to direct current voltage by a power supply 71 and delivered to the various components.

In the present embodiment, a CPU 72, RAM 73, ROM 74, image processor 75, sound processor 76, and I/O 79 80 and 81 are connected via a bus 90 enabling them to send and receive signals in both directions. The image processor 75 is connected to the projection television 65, and the sound processor 76 is connected to speakers 77.

To the I/O interface circuit 79 is connected the cabinet 65, which is equipped with the coin insertion slot and setting buttons for setting the level of game difficulty, for example. To the I/O interface circuit 80 are connected a reel encoder 82 for sensing winding rotation by the reel 61, a powder clutch 83 for regulating the winding torque of the reel 61, a cross-shaped key 84 for moving the cursor on the game screen, and a reel controller 86 for exchanging signals with game lure input button 85 and the like.

To the I/O interface circuit 81 are connected a transverse mechanism 10 equipped with a motor 12 and sensing unit 20 for sensing motion of the aforementioned fishing line 2; a vibrating unit 30 equipped with a motor 33 and sensor 87 for sensing the zero-position of the eccentric roller; a slack take-up unit 40 equipped with a volume 88 for regulating the tension of the fishing line 2; and a longitudinal mechanism 50 equipped with a motor 54 and a limit position sensor 89 for the slide table.

ROM 74 stores the game program, data for characters appearing in the game, system programs for the device, initialization data, and the like. The control means, here the CPU 72, refers to the game program stored in ROM 74 and to signals from the reel controller 86, transverse mechanism 10, and other components input through the I/O interface circuits 80, 81, and so on to execute and control the fishing game program for the entire fishing game device.

RAM 73 stores data computed by the CPU 72 as needed. Ranking data indicating the weight of fish caught by players and the like is stored in a backed up area of RAM 73.

The image processor 75 performs projection conversion on data, such as position coordinates for game characters in the virtual three-dimensional game space which has been processed by the CPU 72, to transform it into screen coordinates for display on the projection television 65. The sound processor 76 uses data stored in an external memory 78 or the like to synthesize signals for game music, sound effects, and so on synchronized with execution of the program by the CPU 72. Music and other such sounds are output through the speakers 77.

Figure 14:
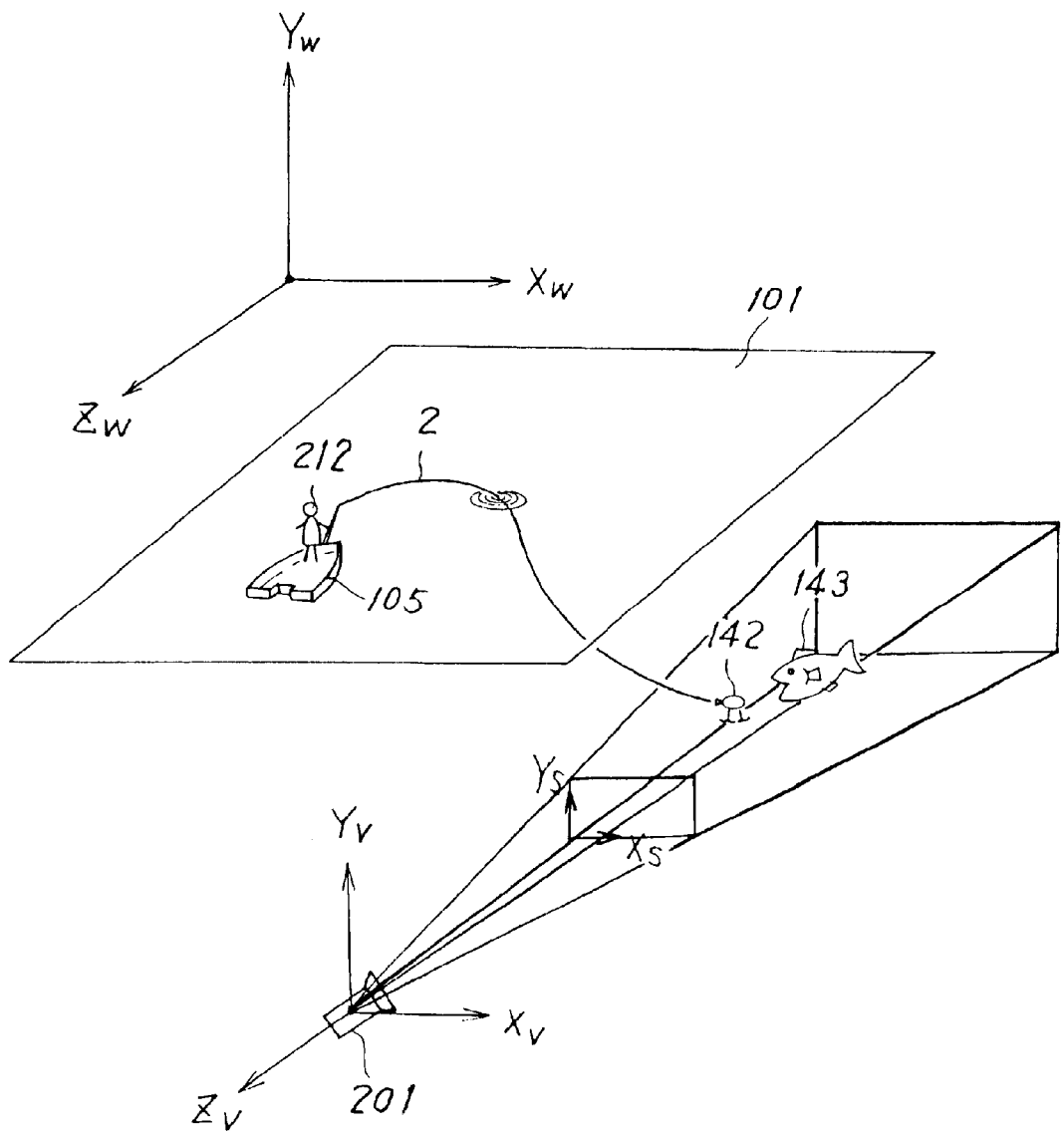
FIG. 14 is an illustrative diagram of the coordinate system of the embodiment of FIG. 13.

FIG. 14 is an illustrative diagram of the coordinate system of an embodiment of the present invention. The virtual three-dimensional game space is represented by world coordinates (Xw, Yw, Zw). Objects such as a boat 105, fisherman 212, lure 142, fish 143, and the like move about freely within these world coordinates. Polygon data and position coordinate data within the world coordinate system for these objects is stored in ROM 74, for example. As it executes the game, the CPU 72 calls the position coordinate data and the like and processes this data together with motion data for the fishing line 2 sensed by the sensing unit 20, for example, and updates movement of the objects through the lake 101 and background scenery of the world coordinate system.

In order to display objects within the world coordinate system on the screen of the projection television 65, position coordinates for the lure 142, fish 143, and other objects within the world coordinate system are converted to viewpoint coordinates (Xv, Yv, Zv) having as the origin the viewpoint of a camera 201. Processes such as clipping are executed with reference to the orientation of the line of sight and the field of view from the camera 201, and projection conversion to produce two-dimensional screen coordinates (Xs, Ys) are performed. The image created through projection conversion into screen coordinates is displayed on the projection television 65 screen.

Figure 15:
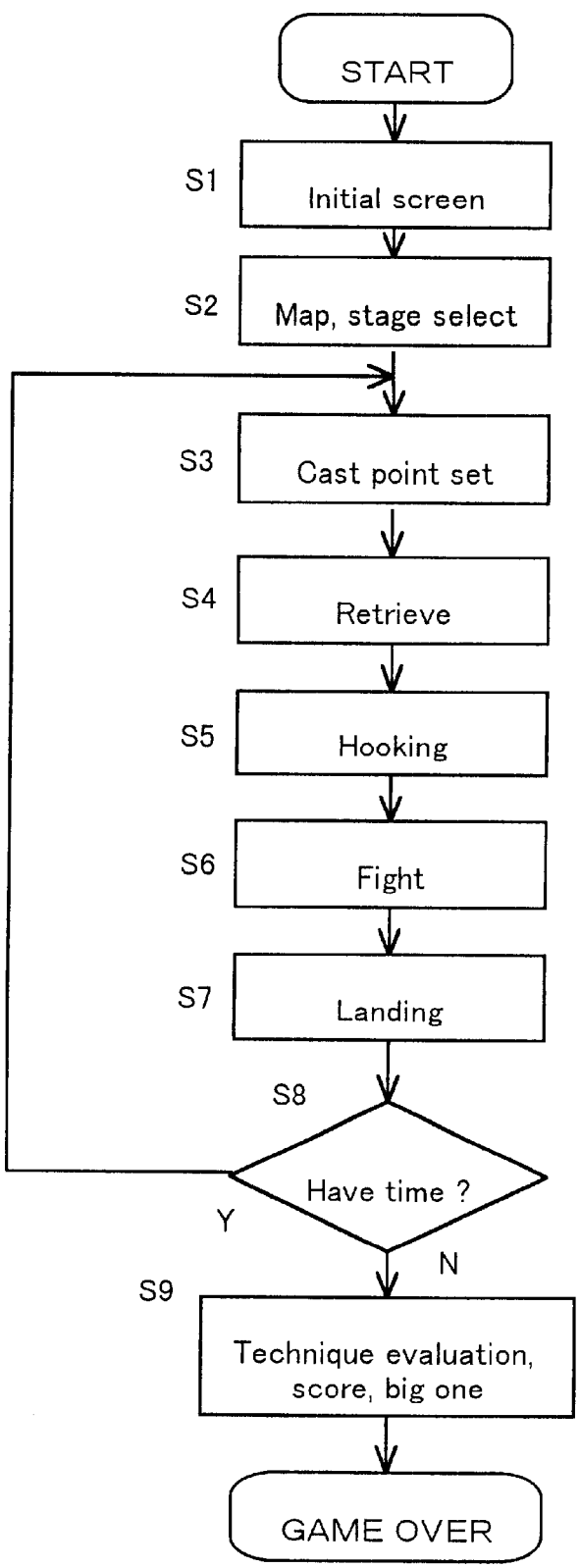
FIG. 15 is an operation flow chart for an example game in an embodiment of the fishing game device of the present invention.

FIG. 15 is an operation flow chart for a fishing game in an embodiment of the present invention. The control flow for game execution will be described referring to this flow chart, taking the example of fishing for black bass. In the following description, the operation flow depicted in FIG. 15 is assumed to be accomplished through execution, under to control of the CPU 72 that constitutes the control means, of a game program stored in ROM 74, this process also reflecting input signals input through player control.

First, a coin is inserted in the coin slot 63 provided to the cabinet depicted in FIG. 12, and a setting button is used to set the degree of difficulty of the game, whereupon the game begins and an initial screen is shown on the projection television 65 (STEP S1).

This initial screen allows the game mode to be set to beginner mode, advanced mode, or tournament mode, for example. Where beginner mode is selected, an explanation of the game, scoring, and the like are displayed on the screen.

Next, a map and a stage select screen are displayed (STEP S2). The map and stage select screen comprise the display screen 100 depicted in FIG. 16, for example. An area of the lake 101 or other location that is the fishing field is shown enlarged. A number of fishing location stages in the lake 101 differing in terms of the specifics of the game are shown; in the example depicted in FIG. 16, three stages are shown, a "reed" stage 102, a "lodge" stage 103, and a "standing tree" stage 104. A boat 105 is shown on the lake, and the player is depicted riding in the boat to the selected fishing location stage.

Figure 16:
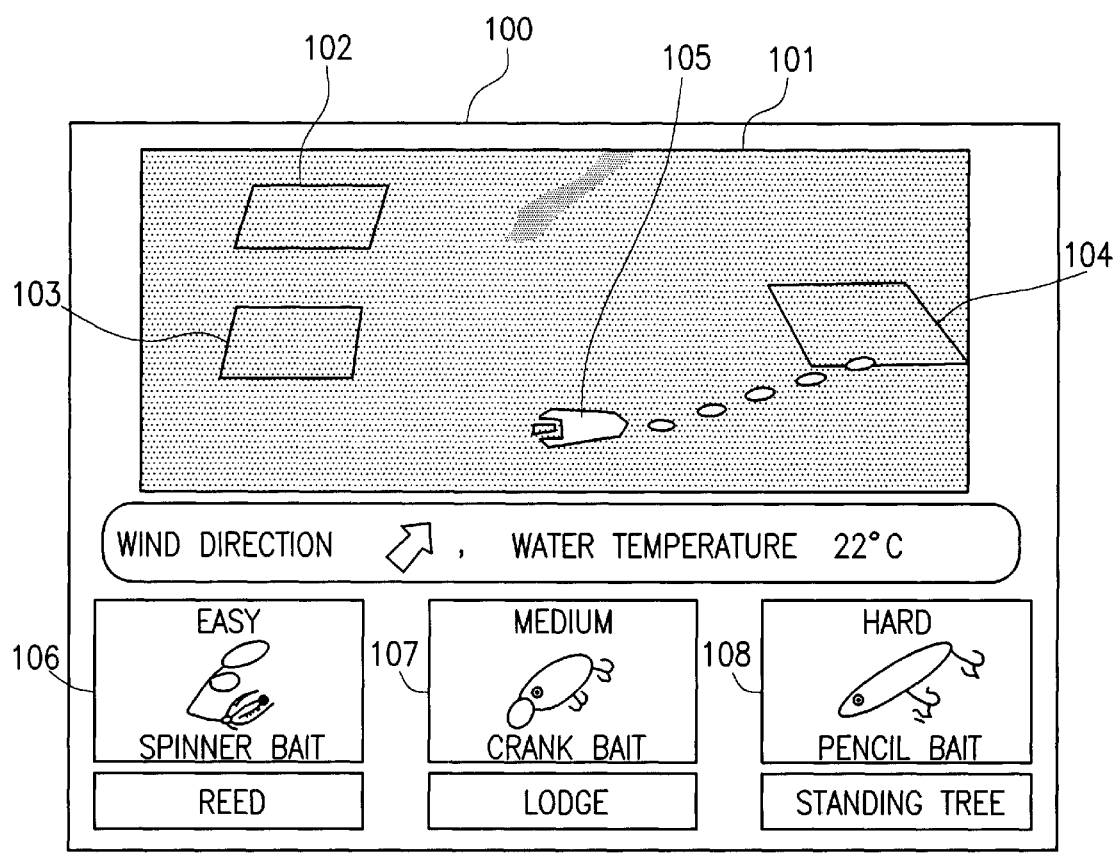
FIG. 16 depicts a map and stage selection screen in an embodiment of the present invention.

From the screen display shown in FIG. 16 the player is allowed to select the lure to be used in fishing for black bass. In the example depicted in FIG. 16, the choices are spinner 106, crank 107, and pencil 108. In the fishing game pertaining to the present embodiment of the invention, the location of the fish will change depending on wind direction over the lake 101 and the water temperature in the lake 101; accordingly, the player chooses the fishing location stage where the fish are most likely to be referring to the wind direction and water temperature shown on the screen 100, and then selects the lure preferred by the fish that are located in the selected fishing location stage.

Once the player has selected the fishing location stage and the lure, a screen showing the boat 105 sailing over the lake 101 to the selected fishing location stage is displayed. Superimposed over the screen are a message indicating the minimum weight in grams of the fish that must be caught in order to beat the stage, for example.

Figure 17A:
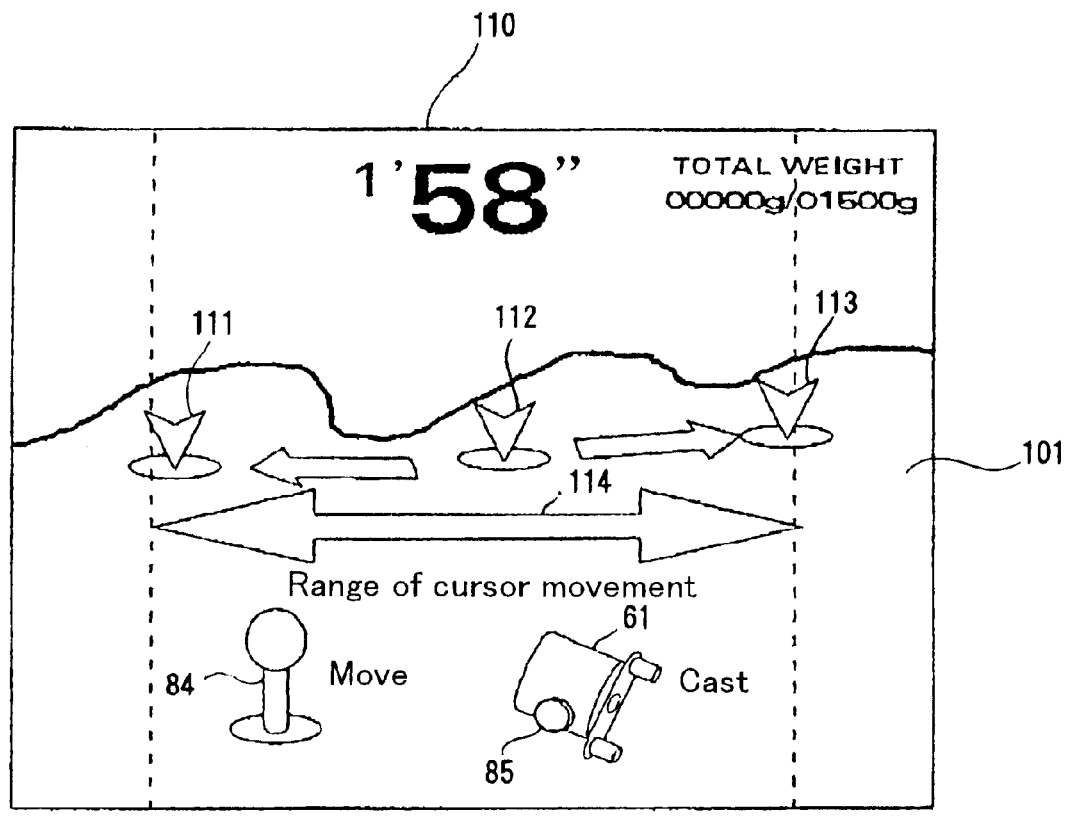
FIGS. 17A and 17B depict casting point setting screens in an embodiment of the present invention.

The next screen shown depicts the boat 105 slowing down as it arrives at the fishing location stage selected by the player. At this point, the cast point for the lure is set (STEP S3). FIG. 17A depicts an example of the cast point setting screen 110. When the boat 105 arrives at the selected fishing location stage, the player uses the cross-shaped key 84 provided to the reel 61 to move a cursor 112 in directions 111 and 113, for example, in order to select the cast point. Once this cast point setting screen 110 is shown, there begins a countdown over a limited time interval established for the particular game mode, for example. The remaining time being shown on the screen. The cross-shaped key 84 and reel 61 are shown on the screen in FIG. 17A to facilitate operation of the cross-shaped key 84 and reel 61 by the player.

Figure 17B:
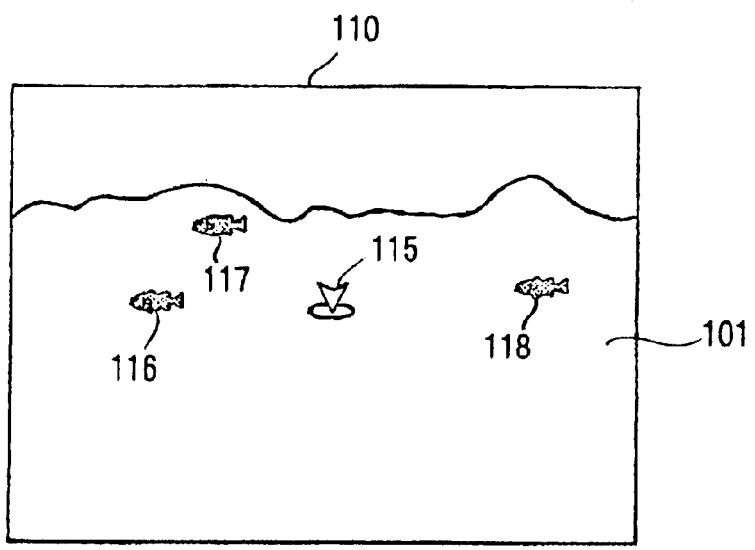

Referring now to FIG. 17B, fish icons 116–118 indicating that fish are present in the lake 101 are also shown on the cast point setting screen 110, allow the player to set the cast point 115 to a location where a fish is present. Once the cast point has been selected, the player pushes a button 85 provided to the reel 61, whereupon a screen depicting the lure being cast to the selected cast point is displayed.

Specifically, when the button 85 is depressed, this is detected by the CPU 72, which displays the screen corresponding to the game program. Subsequent processes are basically the same, with the CPU 72 executing the fishing game program while causing any input signals resulting from player control inputs to be reflected in the game program.

Figure 18A:
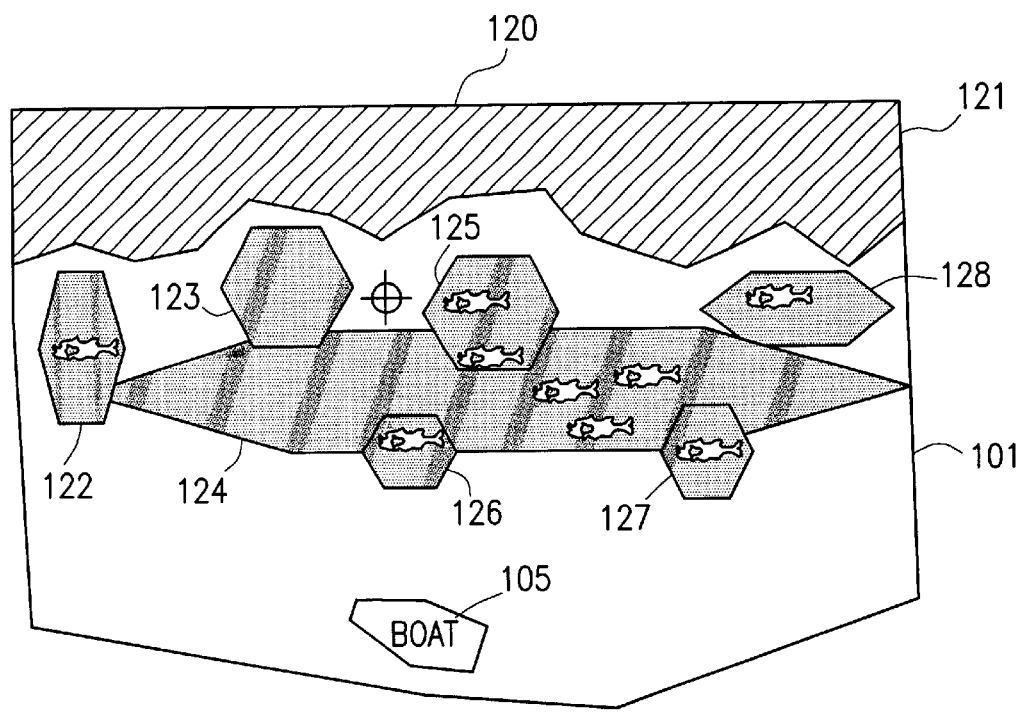
FIGS. 18A and 18B are illustrative diagrams of fish locations within a stage in an embodiment of the present invention.
Figure 18B:
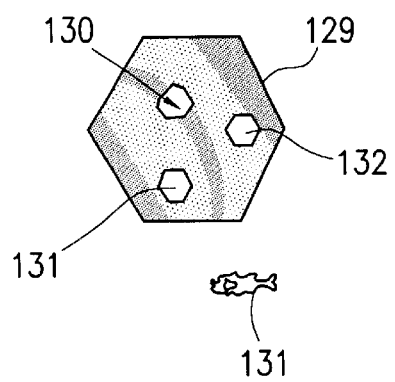

FIGS. 18A and 18B are illustrative diagrams of fish locations within a fishing location stage in the present embodiment of the invention. A fishing location stage 120 is shown as an example in FIG. 18A; this fishing location stage 120 is composed of lake 101 and land 121. The fishing location stage 120 is further divided up into a plurality of areas 122–128, with movement of any fish in an area being limited to within that area. As mentioned earlier, the area in which fish are present is determined by wind direction over the lake 101 and the water temperature, and settings are controlled such that the lure selected for fishing in a particular area is one resembling an organism eaten as food by the fish in that area. This allows the player, through selection of the proper lure and the like, to enjoy an experience similar to that of actual fishing.

This settings control is made possible by updating of fish data performed by the CPU 72 with reference to the parameters of wind direction over the lake 101 and water temperature.

Program settings also enable fish larger than a certain prescribed size to move between different fishing location stages within each game. This creates variation in the fishing location stages in which big fish appear, increasing the motivation to "land the big one." Control is also performed in such a way that parameter data for individual fish is updated so as to allow fish to grow in size during operation of the game device, with the extent of growth depending on factors such as the number of times the fish has been hooked. By having fish that have never been hooked grow to especially large size, the motivation to find a "surefire spot" where a "big one" is present is stimulated.

Data for fish that have grown to different extents depending on operation time and the number of times the fish has been hooked, weight ranking data for the fish caught by a player, and the like is stored by being written to RAM 73 shown in FIG. 13, for example. This allows the player to be presented with a new impression each time the game is played, causing the player to desire to play the fishing game repeatedly.

FIG. 18B depicts one area 129 within the fishing location stage 120. Within the area 129, a number of structures 130–132, such as rocks, are present and the point at which the fish 131 is present is set. Here, fish can be classified in terms of behavior into four broad types. The first type of fish simply stays in place. The second type of fish swims around and around a single structure, while the third type of fish swims back and forth among a plurality of structures. A fourth type of fish swims around in a wide area. Differentiating fish attributes in this way provides to the player the interest of deciding which type of fish to target.

Figure 19:
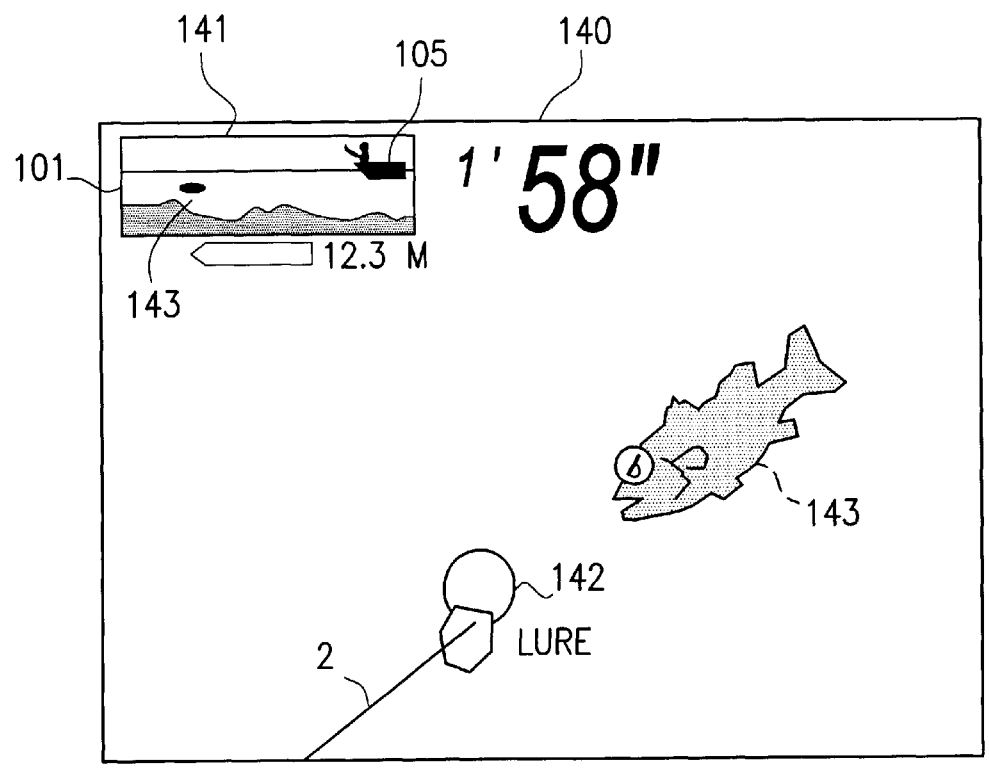
FIG. 19 is a retrieve screen in an embodiment of the present invention.

Next, a retrieve screen in which the fishing line 2 is retrieved is displayed (STEP S4). An example of a retrieve screen 140 is depicted in FIG. 19. The fish 143 is shown approaching the lure 143. Also shown in the retrieve screen 140 are a small display 141 that displays a vertical cross section of the lake 101, including the fish 143 and the boat 105 in which the player is riding, as well as the distance from the player to the fish. This allows the player to grasp the overall situation in the lake 101, further enhancing the enjoyment of fishing.

Since the direction of movement of the fishing line 2 is sensed by the sensing device described earlier, lure motion reflecting with high sensitivity the motions of the fishing rod 1 manipulated by the player can be simulated.

FIGS. 20A through 20D are illustrative diagrams of fish parameters in an embodiment of the present invention. Fish activity is a parameter determining fish personality, behavior, and the like, and is modified in response the action of the lure manipulated by the player. Specifically, the activity value for a particular fish indicates the extent to which the fish will react to the lure. A fish with a high activity value will tend to react to slow lure or to a lure of any time. These parameters are defined in the game program.

Figures 20A, 20B, 20C, 20D:
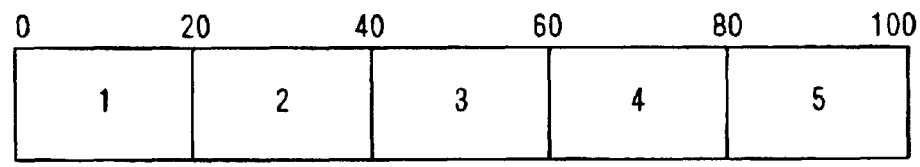
FIGS. 20A through 20D are illustrative diagrams of fish activity in an embodiment of the present invention.

In the present embodiment of the invention, fish activity is expressed as a numerical value from 0 to 100, and the fish are grouped into five activity groupings, as shown in FIG. 20A. For example, a fish with an activity value of 0 to 20 would fall into activity grouping 1. Differentiation of the extent to which fish respond to the lure by fish activity value is shown diagrammatically in FIG. 20B. FIG. 20B shows different threshold fish swimming speeds established for fish belonging to different activity groupings. Under program control, the activity value of a particular fish is increased where a proper lure and proper lure action for that fish have been selected, and is conversely lowered where an improper lure and improper lure action have been selected. Thus, the activity value of a fish having a low activity value can be increased through manipulation of lure action by the player, making the fish easier to catch.

In the present embodiment of the invention, each fish has a different character, thereby increasing the player's interest. Fish are classified by shape as jumbo, large, medium, and small, for example. Fish expressions are differentiated so as to appear nervous, cautious, hungry, jittery, excited, panicked, or the like, and the motion of the dorsal fins and gills are varied in response to the expression.

From the expression and movement of a fish, a player can make a decision as to the most appropriate lure action for catching the fish, providing enhanced enjoyment that cannot be experienced in actual fishing. Fish status by activity value is tabulated in FIG. 20D.

An example of fish attribute parameters in an embodiment of the present invention is shown in FIG. 21. Fish registered in the game are assigned fish numbers. For a fish having a fish number of 1, for example, attribute parameters such as the following could be defined as initial values: activity number=5; proper lures for catching=A, B; improper lure= D; proper lure action for catching=a, improper lure action for catching=d.

This attribute parameter data is stored in ROM 74 in the game device, for example, and is called by the CPU 72 as the game proceeds. The CPU 72 processes this data together with signals reflecting lure action caused by the player and input through the I/O interfaces 80 and 81, and outputs the results to the image processor 75 and the sound processor 76. At the same time, fish attributes are updated where the aforementioned conditions have been met.

Next, control turns to the hooking biting the lure sequence (STEP S5). The determination as to whether a fish has bitten the lure is made in the following way. Illustrative diagrams showing relationships among lure action, activity value, and bite flag value are given in FIGS. 22A and 22B. The bite flag value is a parameter for deciding whether a fish has bitten the lure; it is computed by the CPU 72 and is stored in RAM 73. The bite flag value is increased or decreased with reference to the lure action produced by the player.

FIG. 22A is a table showing, in the case of a spinner lure, how the fish will behave in response to particular lure actions, and how the activity value and bite flag value will increase or decrease. The table in FIG. 22A is for a spinner lure; similar tables are provided for crank, pencil, and other lures. The data shown in the table is stored in ROM 75, for example, and as the game proceeds is called and processed by the CPU 72.

Turing now to a more detailed description referring to FIG. 22A, where the lure cast by the player reaches the surface of the lake, the behavior of a nervous fish having an activity value of 0 to 30 will be to ignore the lure or swim away from the lure in a probability ratio of 5:5. The activity value of the fish decreases by two "Δ" and the bite flag decreases by one "Δ".

In the case of an excited fish having an activity value of 71 to 100, the response of the fish when the lure hits the water will be to swim towards the lure; the activity value and the bite flag of the fish both increase by one "○". The "☆" appearing in the bite flag value column indicates that when the player produces a prescribed lure action to attract an excited fish having an activity value of 71 to 100, the fish will bite the hook. Fish behavior in response to various lure actions such as pose, fast retrieve, and the like are predetermined.

FIG. 22B is an explanatory diagram of bite flag value. The bite flag value held in the CPU 72 is increased or decreased depending on the lure action produced by the player; when the value exceeds 10, bite setup is complete. In this state, the application of a trigger action to the lure by the player will cause the fish to bite the lure.

Figure 23A:
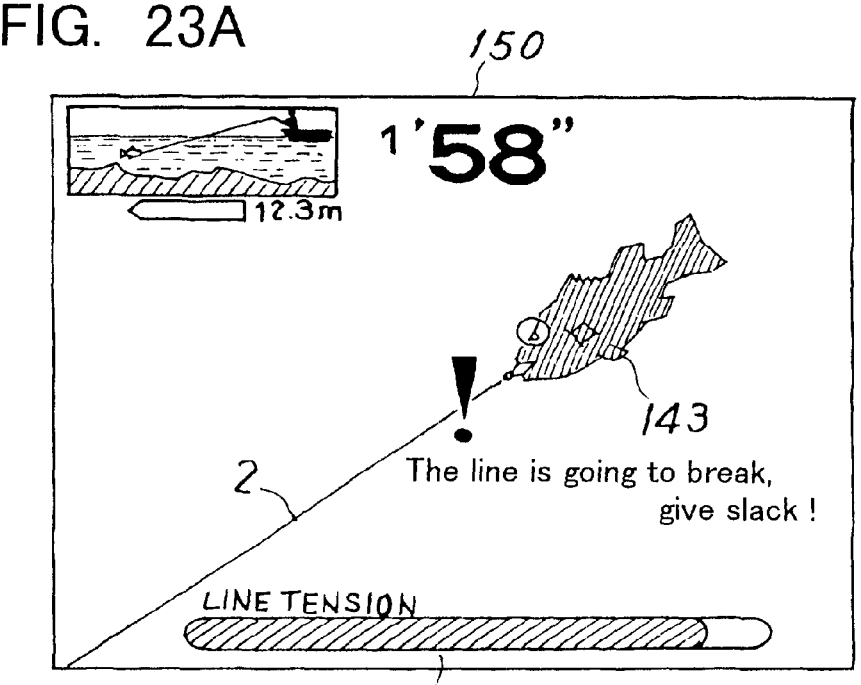
FIGS. 23A through 23C are fight screens in an embodiment of the present invention.

The system now proceeds to a fight struggle with the fish that has bitten the lure sequence (STEP S6). An example of a fight screen 150 in a working example is shown in FIG. 23A. The pulling force exerted on the fishing line 2 when the fish bites on the lure is sensed by the vibrating unit 30 and the sensors 87 and 89 of the longitudinal mechanism 50 (see FIG. 13) in the manner described earlier, and an indicator 151 indicating the pulling force on the fishing line 2 is displayed on the fight screen 150. Where the pulling force is too strong, a message or hint to this effect is displayed.

Figure 23B:
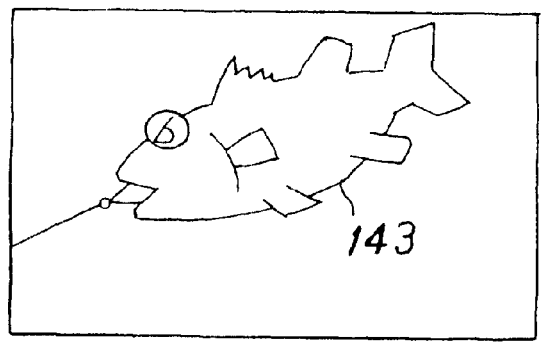
Figure 23C:
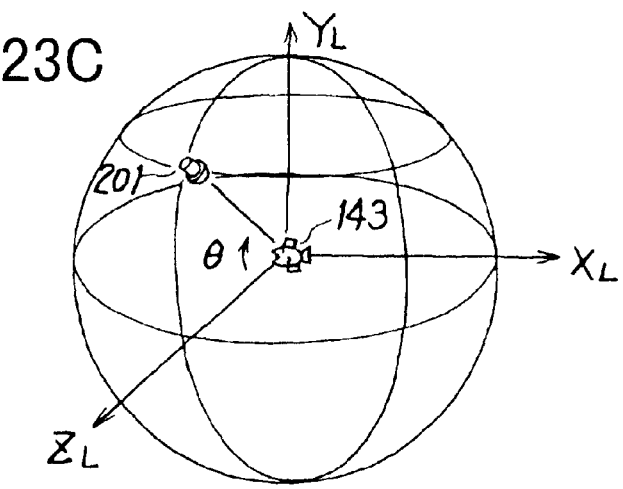

FIG. 23B depicts a screen showing the fish in close-up to the camera during the fight. The camera viewpoint is manipulated in such a way that the fish stays just above the vertical center of screen. The camera viewpoint moves upward as it approaches the fish. As shown in FIG. 23, display control during this sequence limits to a maximum of 45° the angle formed by the line of sight of the camera 201 and the plane XL ZL defined by local coordinates (X1, Y1, Z1) having the fish 143 as the origin. This facilitates viewing of the movements of the fish and intensifies the feeling of hooking a fish.

The system now proceeds to a reel-in sequence (STEP S7). The contents of the reel-in screen differ depending on the size of the fish caught, creating a more elegant atmosphere for larger fish. At the same time a voice message such as "good fish!" is issued from the speakers 77. The CPU 72 computes the weight of the caught fish and the total weight of fish caught in the particular fishing location stage, comparing these with condition data, and indicates on-screen whetter the norm for the particular fishing location stage has been reached.

Next, a check is performed to ascertain if the time limit for the game has expired (STEP S8). If there is time remaining, the system returns to STEP S3; if no time remains it proceeds to STEP S9.

In STEP S9, the skill level of the player, as determined from information such as the size of the fish, the time elapsed in catching it, and so on are displayed along with tips and pointers. The weight of the largest fish caught by the player is shown; this value is also compared with the weight of fish caught in the past stored in RAM 73 and the ranking displayed. This fuels the competitive urge of the player to catch larger fish. The game ends once the prescribed time has elapsed.

The fishing game of the fishing game device of the present invention proceeds according to the operation flowchart described above. The camera shot layout used to render the fishing images in computer graphics is crucial in terms of providing the player with the excitement of actual fishing.

The camera viewpoint used to portray objects in the world coordinate system moves according to various algorithms. The following movement is used to track the lure through the water. In STEP S3 in FIG. 15, when the lure hits the water the lure is projected on the screen. As the lure is moved within the world coordinates through manipulation of the fishing rod 1 and the reel 61 by the player, its direction of movement and position are computed by the CPU 72 by sensing the movements of the fishing rod 1 and the reel 61 manipulated by the player. Thus, the camera viewpoint angle moves in response to movement of the lure. In other words, movement of the lure is displayed in response to movement of the camera viewpoint angle.

The camera viewpoint angle moves in tandem with the lure, maintaining a prescribed distance and angle in front of the moving lure. Where a rock or other obstacle appears in the water, a course detouring around the obstacle is selected in order to prevent the lure from being hidden from view. This is accomplished by placing in ROM 74 coordinate data for obstacles and collision data indicating prescribed ranges that include the obstacles. In the event that the camera viewpoint coordinates collide with collision data, a detour route is created according to a prescribed algorithm. The calculations are performed by the CPU 72.

Figure 24A:
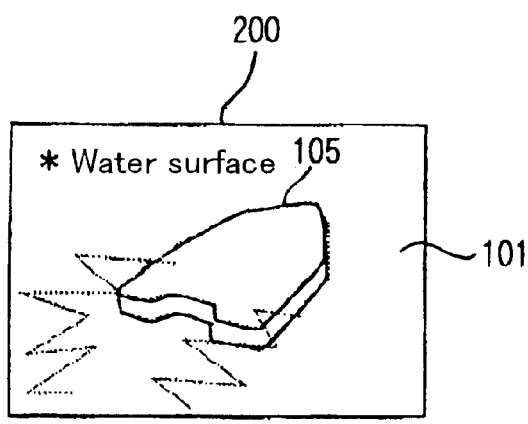
FIGS. 24A through 24C are illustrative diagrams of camera shot layout for a boat running at full speed in an embodiment of the present invention.
Figure 24B:
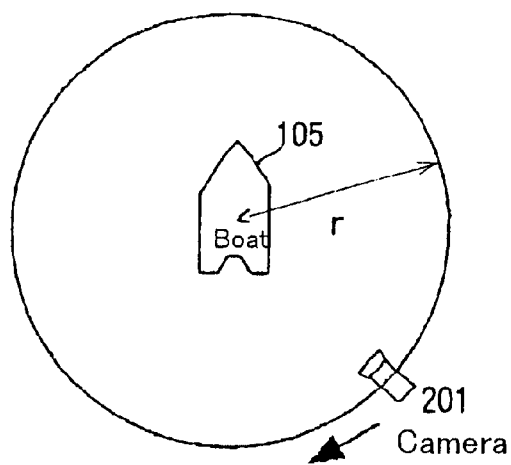
Figure 24C:
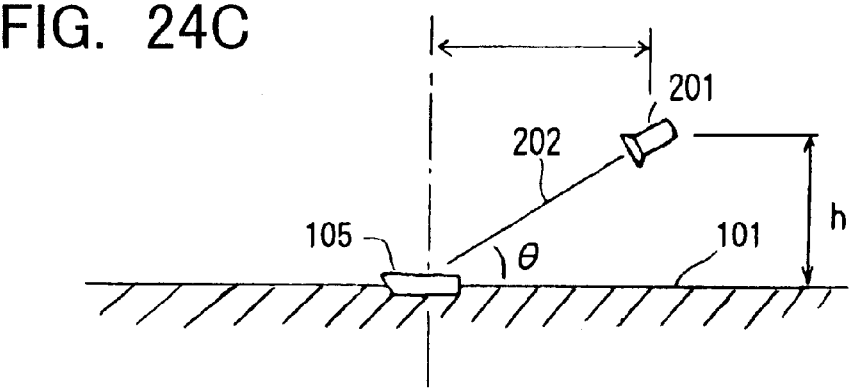

FIGS. 24A through 24C are illustrative diagrams of camera shot layout for the boat running at full speed after the player has selected the fishing location stage in STEP 2 in FIG. 15. An example of a boat cruising screen 200 projected on the projection television 65 is depicted in FIG. 24A. The boat 105 is depicted travelling over the surface of the lake 101 leaving a wake.

FIGS. 24B and 24C are illustrative diagrams of camera shot layout for the boat cruising screen 200. The boat 105 cruises through a world coordinate system in the virtual three-dimensional game space; the background is converted into a viewpoint coordinate system having as the origin the viewpoint of the camera 201. The viewpoint coordinate system is further projection converted into a two-dimensional screen coordinate system for display on the projection television 65 screen.

As the boat cruises along, the camera 210 continues to move over a circle having a radius r centered on the boat and within a horizontal plane located a height h above the lake 101 in the world coordinate system. Through proper manipulation of the height h and the radius r, it is possible to vary the angle θ of the line of sight 202 of the camera 201 with respect to the lake 101, allowing the entire lake 101 and the boat 105 speeding over the surface of the lake to be portrayed in a dynamic way.

Figure 25A:
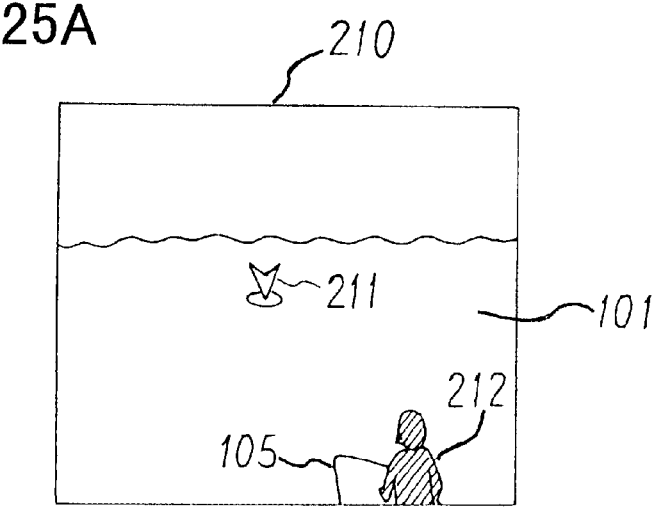
FIGS. 25A through 25C are illustrative diagrams of camera shot layout for boat arrival in an embodiment of the present invention.
Figure 25B:
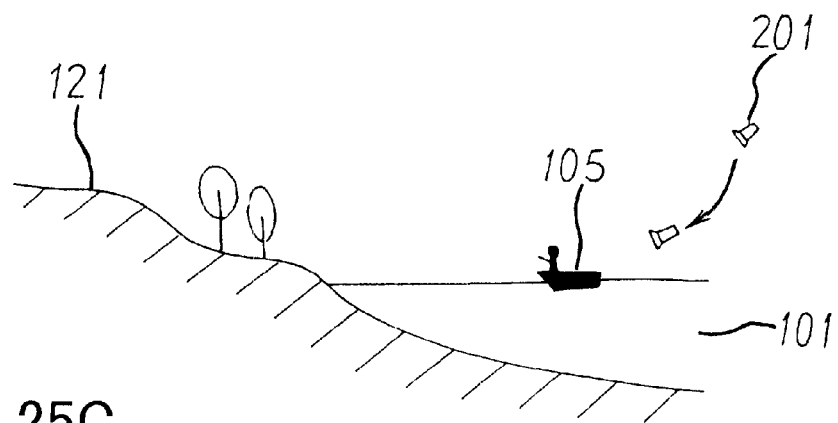
Figure 25C:
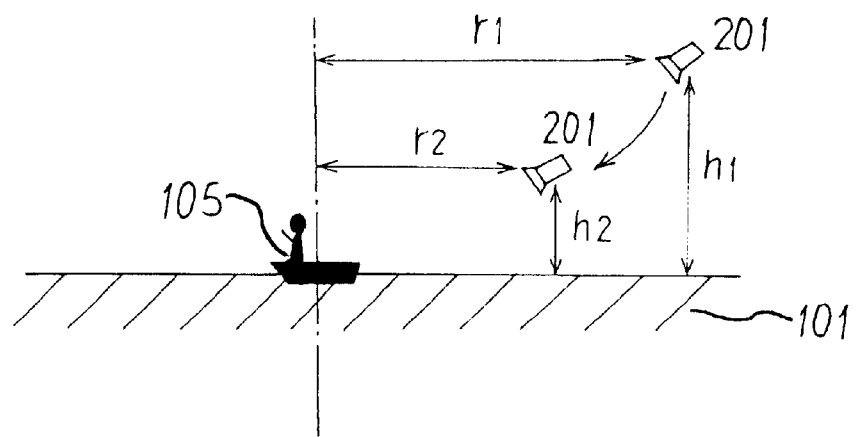

FIGS. 25A through 25C are illustrative diagrams of camera shot layout for the boat reaching the fishing location stage that has been selected by the player. As depicted in FIGS. 25B and 25C, as the boat 105 approaches the fishing location stage at reduced speed, the camera 201 circles the air above the boat 105 while descending from height h1 to h2 and moving from r1 to a smaller radius r2. In the screen 210 depicting arrival of the boat 105 at the fishing location stage, the camera 201 comes to a halt at a camera angle showing the boat 105 and part of the fisherman 212 in the bottom portion of the screen, as shown in FIG. 25A. This camera shot layout provides the player with a sense of anticipation that fishing is about to begin.

Figure 26A:
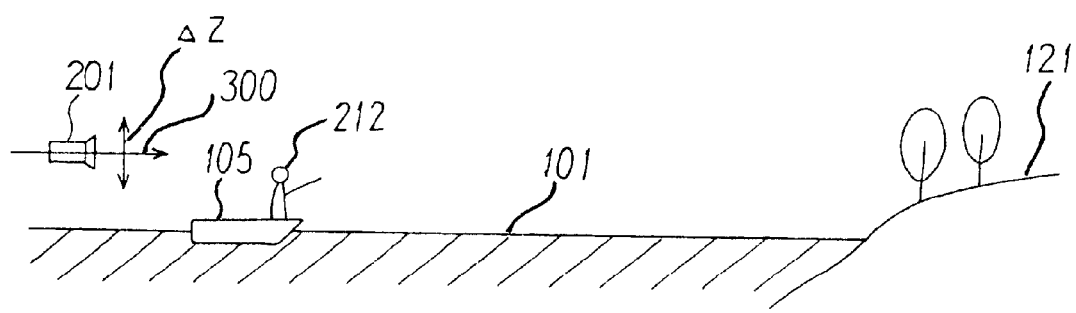
FIGS. 26A and 26B are illustrative diagrams of camera shot layout for boat rocking in an embodiment of the present invention.
Figure 26B:
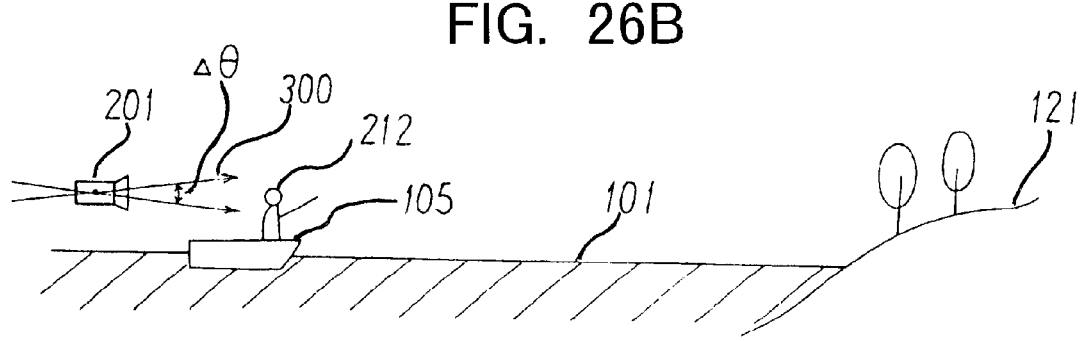

FIGS. 26A and 26B are illustrative diagrams of camera shot layout for depicting rocking of the boat. In the camera shot showing a rear shot of the fisherman 212 in the boat, the extent of vertical bobbing of the boat 105 on the lake 101 is about 5 cm; this is depicted in FIG. 26A through vertical motion of the line of sight direction 300 of the camera 201 by $\Delta z$ about 2 cm in the z-direction within the world coordinate system in association with this movement. With this camera shot, the fisherman 212 located close to the camera 201 moves up and down in the game screen by an extent about equal to $\Delta z$, while the position in the screen of background situated further away from the camera, such as the land 121, trees, and the like changes hardly at all. This makes it difficult to properly depict the rocking motion of the boat 105.

Therefore, according to the method of FIG. 26B, the viewpoint position of the camera 201 is kept stationary, and vertical motion of the boat 105 carrying the fisherman 212 is depicted through vertical oscillation of the line of sight direction 300 of the camera over the angle $\Delta\theta$. With this approach, the fisherman 212 located close to the camera 201 does not move to an appreciable degree, while background elements, such as the land 121 and trees situated further away from the camera move to a significant extent in the vertical direction in the screen, providing the impression of rocking motion by the boat 105.

Figure 27A:
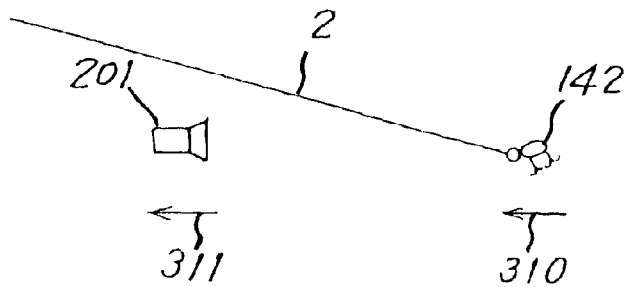
FIGS. 27A through 27C are illustrative diagrams of conventional camera shot layout for avoiding obstacles in the water during retrieval in an embodiment of the present invention.
Figure 27B:
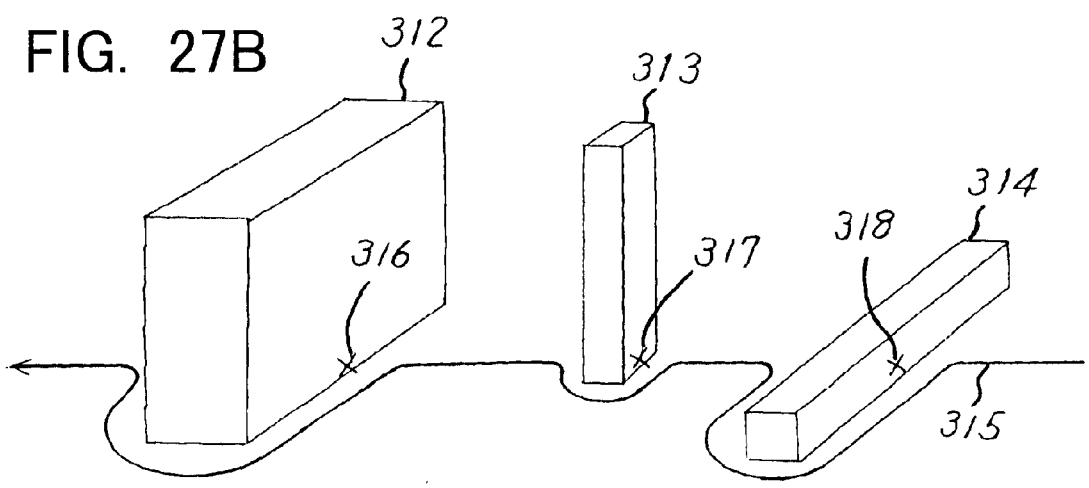
Figure 27C:
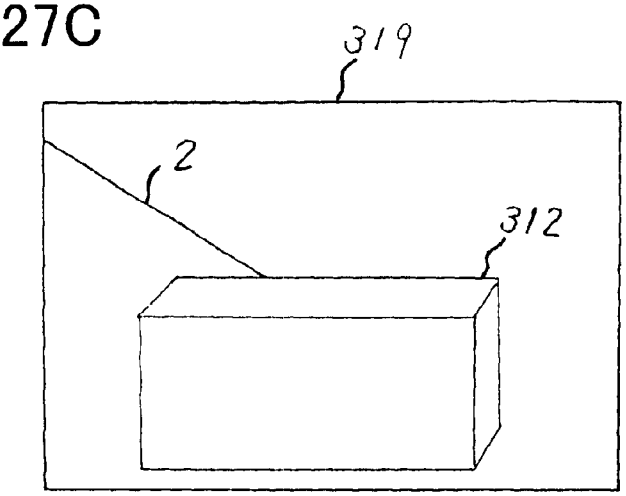

FIGS. 27A through 27C are illustrative diagrams of an algorithm for having the camera avoid obstacles in the water during retrieval. FIG. 27A depicts movement of the lure 142 and the camera 201 in the absence of any obstacles in the water. When the player turns the reel 61 to retrieve the fishing line 2, the lure 142 moves towards the fisherman in the direction indicated by arrow 310 in the world coordinate system. In conjunction with the movement of the lure 142 the camera 201 moves in the direction indicated by arrow 311, all the while showing the lure 142 from a prescribed distance in front of the lure 142.

FIG. 27B depicts the track 315 followed by the camera 201 in the event that obstacles such as a wall 312, tree trunk 313, and driftwood 314 are present in the water. As the camera 201 moves it maintains a prescribed distance in front of the lure 142 manipulated by the player; thus collisions will occur with the obstacles at the locations indicated by the Xs 316, 317, and 318.

In the event of a projected collision with an obstacle, the camera 201 performs some systematic movement such as circling around the side of the obstacle. However, as shown in FIG. 27C, this will cause the lure to disappear behind the obstacle 312 in the game screen 319.

Accordingly, in the present embodiment of the invention there is employed an evasion technique which takes into account the shape of the obstacle when the camera is projected to collide with an obstacle. An analogous evasion technique is employed where the line of sight from the camera to the lure collides with an obstacle. This allows the lure to kept within the field of view of the camera at all time, enhancing the realism of lure manipulation. This will be described referring to FIGS. 28A through 28C.

Figure 28A:
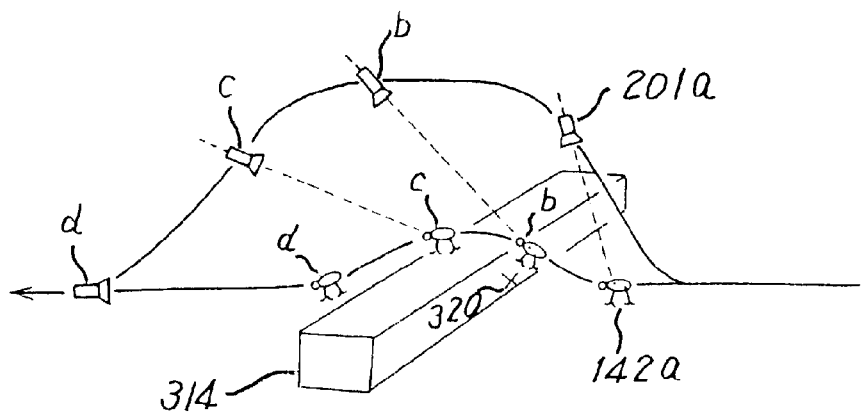
FIGS. 28A through 28C are illustrative diagrams of camera shot layout in this embodiment for avoiding obstacles in the water during retrieval in an embodiment of the present invention.

FIG. 28A depicts an evasion technique for avoiding an obstacle having small vertical extension and wide lateral extension, such as a piece of driftwood 314. The CPU 72, which computes the position of the camera 201 within the world coordinates, predicts on the basis of comparison with coordinates for the obstacle 314 that a collision will occur at location X 320. To prevent this, the camera is moved along a path indicated by 201a, b, c, and d that goes over the obstacle 314, all the while keeping the lure 142a, b, c, and d in view. In order to enhance the impression that the lure is moving, motion of the camera is controlled in such a way that it appears to lag slightly behind the motion of the lure, creating the impression of chasing after the lure. An analogous evasion technique is employed where the line of sight from the camera to the lure is predicted to be blocked by an obstacle.

Figure 28B:
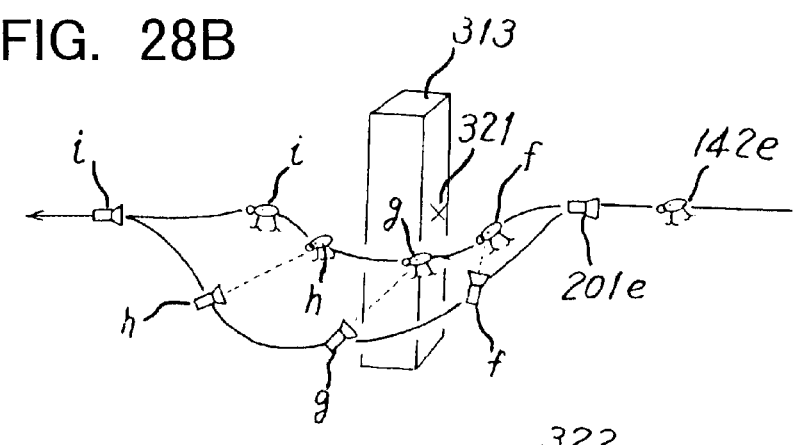
Figure 28C:
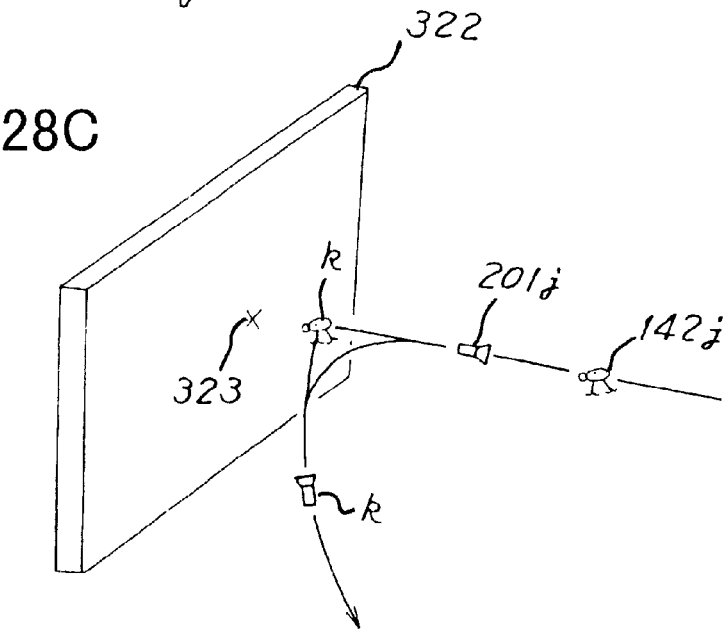

FIG. 28B depicts the camera 201e avoiding an obstacle having high vertical extension and narrow lateral extension, such as a tree 313, by following the path f, g, h, i, thereby circling laterally around the obstacle 313 to avoid collision with it. FIG. 28C depicts the camera 201j confronted with an obstacle that is not easily avoided by going vertically or sideways, which it avoids by following path k back around in the reverse direction.

Figure 29A:
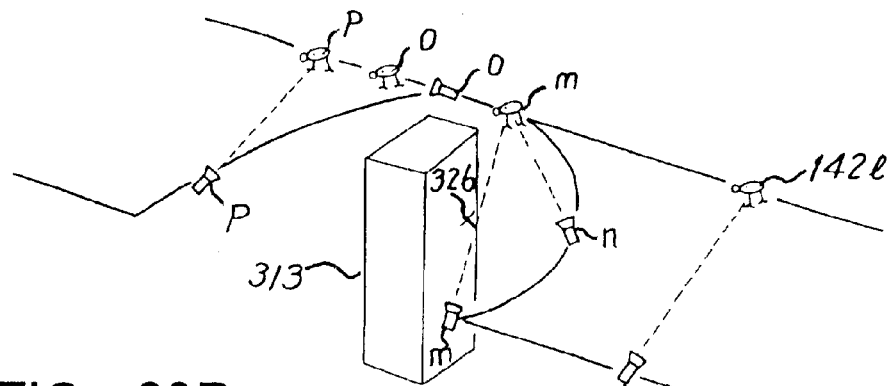
FIGS. 29A through 29C are illustrative diagrams of the line of sight from the camera to the lure colliding with an obstacle in an embodiment of the present invention.
Figure 29B:
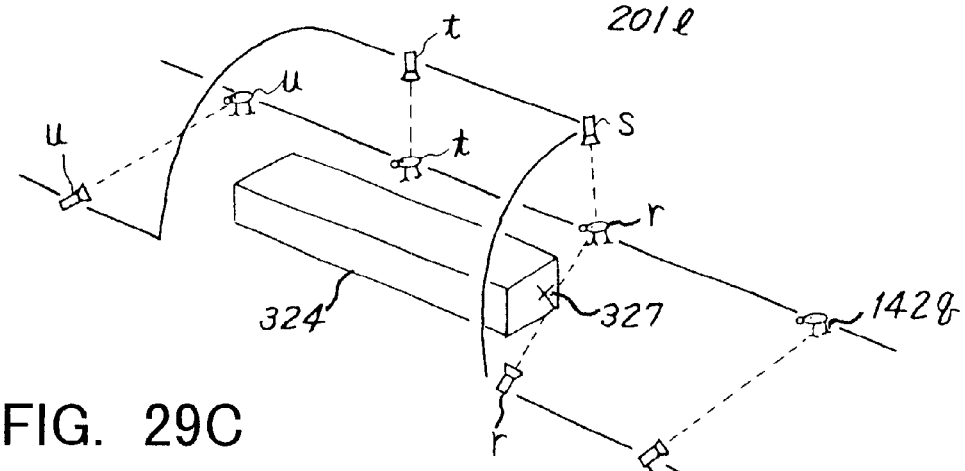
Figure 29C:
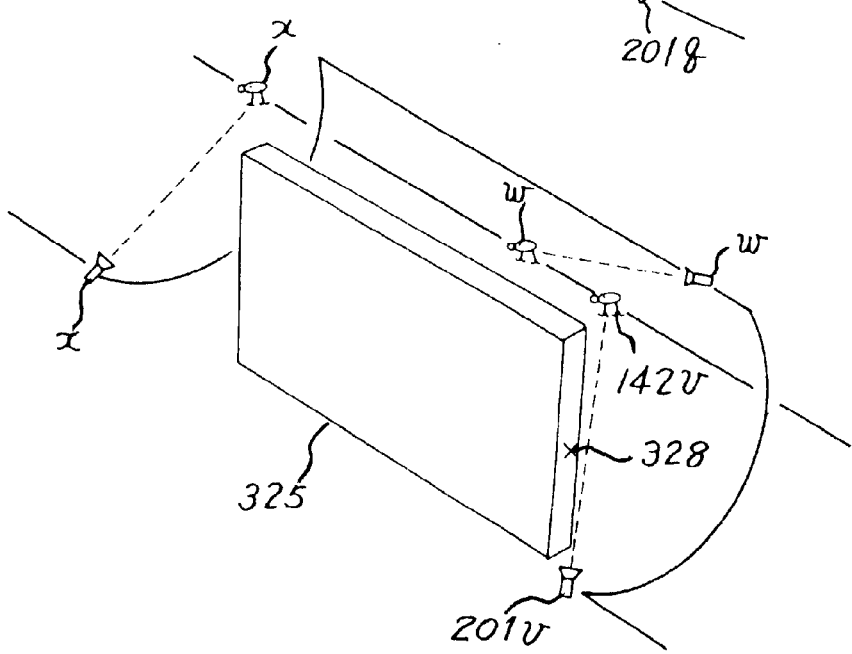

FIGS. 29A through 29C are illustrative diagrams of the camera shots used when the line of sight from the camera to the lure is predicted to collide with an obstacle. In the example depicted in FIG. 29A, the obstacle 313 is a tree or the like. If the line of sight from the camera 201m to the lure 142m is predicted to collide with the obstacle 313 at point X 326, the camera 201 swings around laterally in the manner denoted by n so that the lure 142o is viewed from the back by the camera 201o, and then returns to the original camera track after passing point 201p.

FIG. 29B depicts a scenario in which it is predicted that the line of sight from the camera 201r to the lure 142r will collide at point X 327 with an obstacle 324 having considerable lengthwise extension, such as a piece of driftwood. In this scenario, the camera circles over the obstacle 324 as indicated by s and t, and then returns to the original camera track, as indicated by u.

FIG. 29C depicts a scenario in which it is predicted that the line of sight from the camera 201v to the lure 142v will collide at point X 328 with an obstacle 325 having considerable lengthwise extension, such as a wall. In this scenario, the camera circles around to the opposite side of the lure 142w, as indicated by w, and after avoiding the obstacle 325 returns to the original camera track, as indicated by x.

Figure 30A:
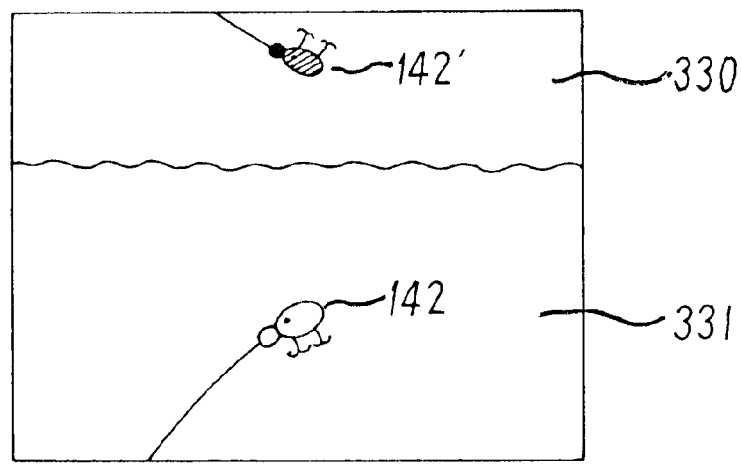
FIGS. 30A and 30B are illustrative diagrams portraying lure shadow on the water surface when the water surface is viewed from underwater in an embodiment of the present invention.
Figure 30B:
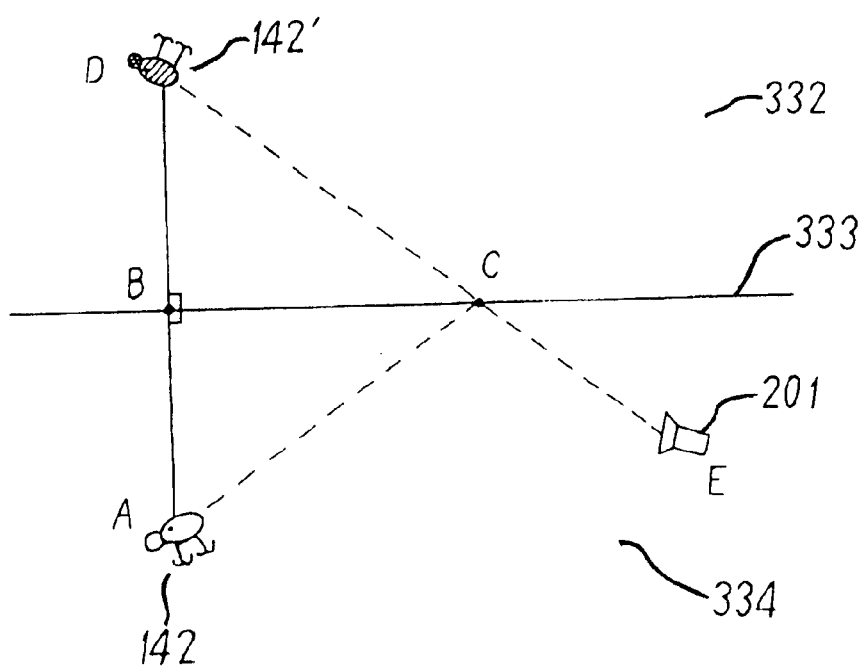

FIGS. 30A and 30B are illustrative diagrams portraying the shadow cast by an object located in the water, such as a lure, on the water surface. The lure is manipulated in proximity to the surface of the water through lure action produced by the player. In some cases, the game screen for this is created by the camera looking up at the surface of the water from underwater. FIG. 30A depicts a game screen showing the shadow 142' or the lure 142 in the water 331 being cast on the water surface 330. By depicting the shadow of the lure being cast on the water surface, the player can be given an idea of the depth of lure, providing a sense of realism to lure action by the player.

FIG. 30B depicts the method for determining the position C of the lure shadow. From the position coordinates A for the lure 142 and the water surface 333 in the world coordinates, position coordinates D for the shadow 142' of the lure on the surface of the water are computed. Specifically, a vertical line is drawn from A to the water surface 333, and the point on the prolonged line thereof where AB=BD is designated as D. The point at which the line connecting D with the position coordinates E for the camera 201 intersects the water surface 333 is designated C, and this serves at the location at which the shadow is projected onto the surface of the water.

Figure 31A:
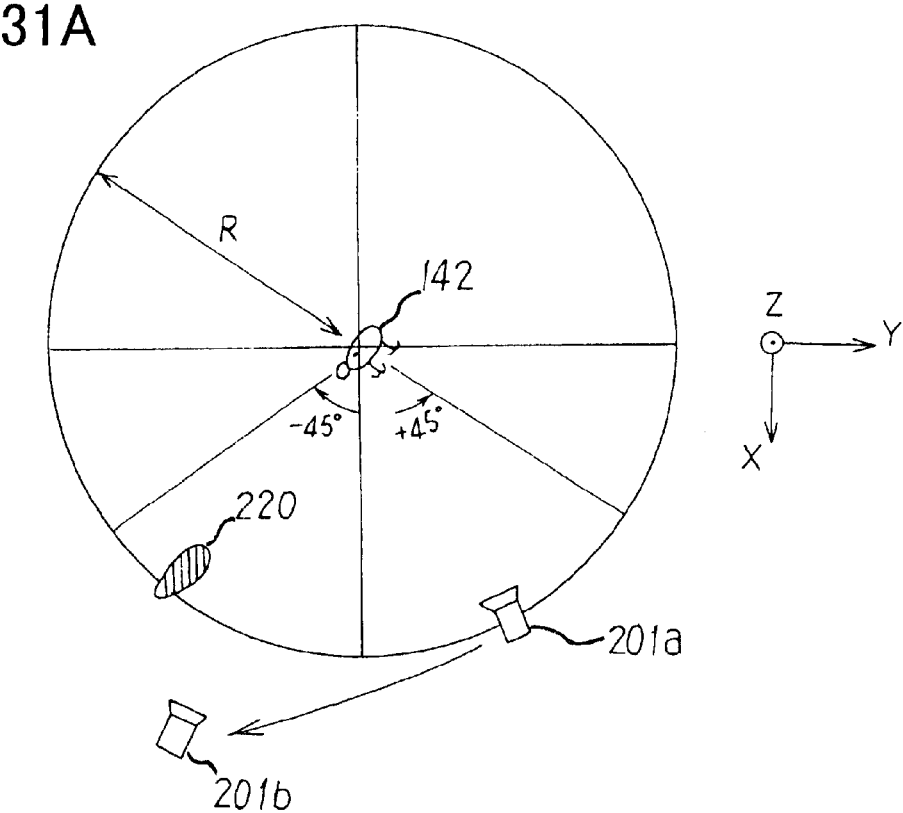
FIGS. 31A through 31C are illustrative diagrams of camera shot layout when the fish is located this side of lure during retrieval in an embodiment of the present invention.
Figure 31B:
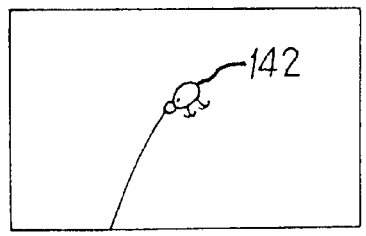
Figure 31C:
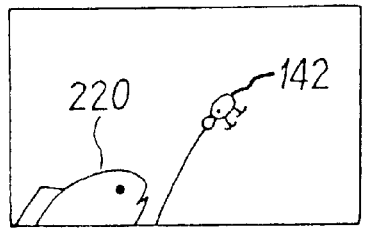

FIGS. 31A through 31C are illustrative diagrams of camera shot layout when the fish is located this side of lure, as viewed from the fisherman, during retrieval. FIG. 31A depicts positional relationships among the camera 201a, 201b and the fish 220 in a local coordinate system having the lure 142 as the origin, the x-axis as the direction of the fisherman, and the vertical direction as the z-axis.

Camera 201a denotes the camera position when the fish is not within an area having a prescribed radius R centered on the lure 142. At this time, only the lure is shown, located substantially in the center on the screen of the projection television 65, as depicted in FIG. 31B.

In the event that the fish 220 enters the aforementioned area of prescribed radius R within an area of about ±45° in the XZ plane, the camera 201a swings around to position 201b located behind the fish. At this time, the lure 142 is shown located substantially in the center on the screen of the projection television 65, and the fish 220 is shows in the left area of the screen, as depicted in FIG. 31C.

In FIGS. 31A through 31C the fish 220 is shown approaching the lure 142 from the left, as seen by the fisherman. If the fish 220 should approach the lure 142 from the right, the scene would be flipped around to the rear left of the fish 220 so that the fish 220 would be shown in the right area of the screen.

In this way the approach of the fish 220 to the lure 142 can be rendered in a realistic manner.

Figure 32A:
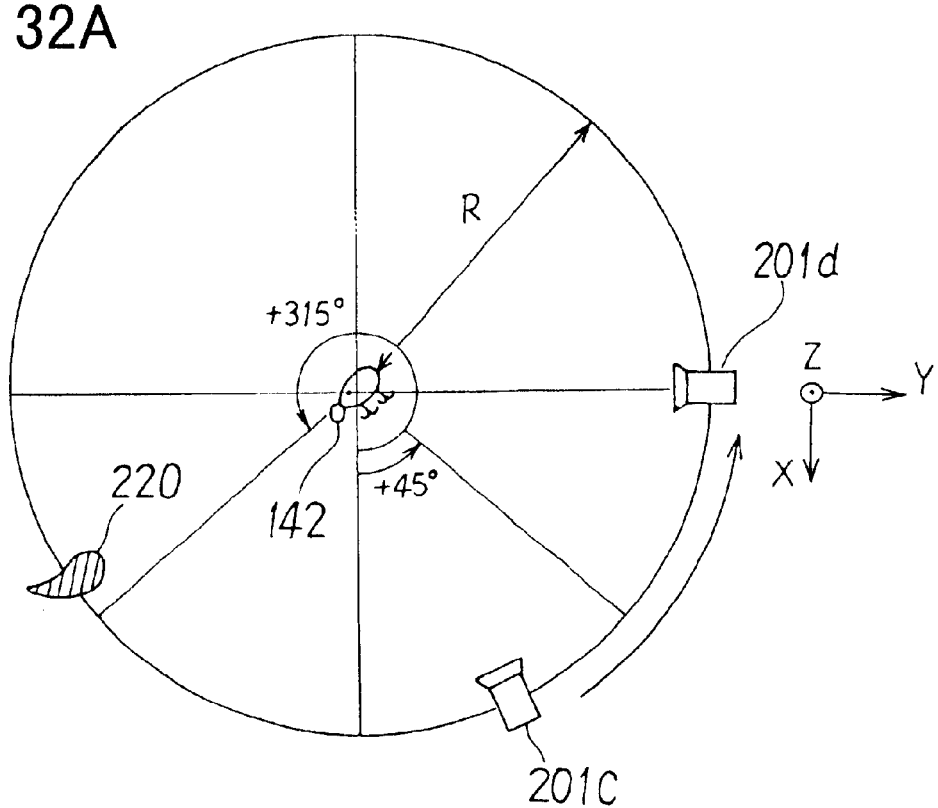
FIGS. 32A through 32C are illustrative diagrams of camera shot layout when the fish is located on the far side of lure during retrieval in an embodiment of the present invention.
Figure 32B:
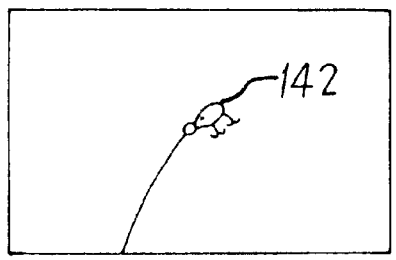
Figure 32C:
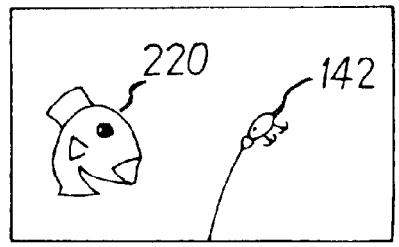

FIGS. 32A through 32C are illustrative diagrams of camera shot layout when the fish is located to the far side of the lure during retrieval. FIG. 32A depicts camera shot layout when the fish 220 enters an area having a prescribed radius R and having the lure 142 as the origin, arriving through an area of about +45° to about +315° in the XZ plane.

When the fish 220 is not within an area having a prescribed radius R centered on the lure 142, only the lure 142 as viewed from camera 201c is rendered, producing the screen depicted in FIG. 32B. When the fish 220 enters through an area of about +45° to about +315°, camera 201c moves to position 201d from which both the lure 142 and the fish 220 are visible, producing the screen depicted in FIG. 32C.

Figure 33A:
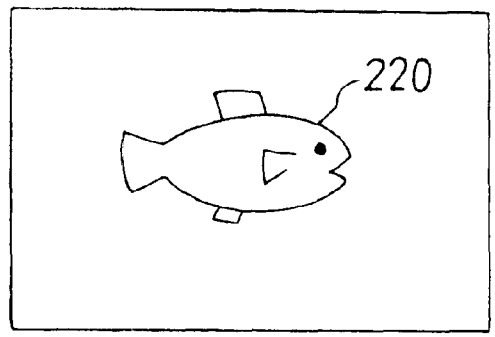
FIGS. 33A through 33C are illustrative diagrams of a method for representing fish movement through control of camera angle.
Figure 33B:
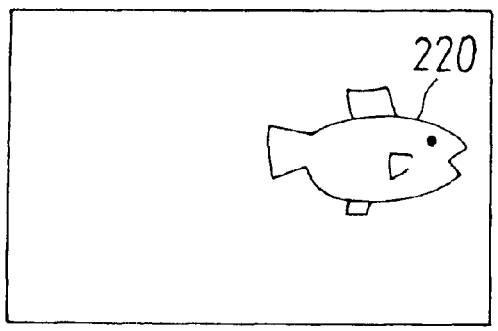
Figure 33C:
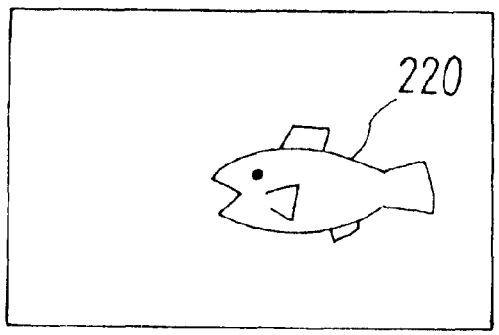

FIGS. 33A through 33C are illustrative diagrams of a method for representing fish movement through control of camera angle. FIG. 33A depicts a screen in which the fish 220 is shown staying in place. The fish 220 can swim freely about in the world coordinate system that constitutes the virtual three-dimensional game space. In the camera viewpoint coordinate system for portraying the fish 220, the line of sight of the camera is directed towards the fish 220. When this camera viewpoint coordinate system is subjected to projection conversion into a two-dimensional screen coordinate system for display on the projection television 65, the fish 220 is shown located essentially in the center of the screen regardless of how it moves about.

Accordingly, in this example, if the fish 220 should swim further to the right, as viewed by the fisherman, it will be shown correspondingly closer to the right edge of the screen, as depicted in FIG. 33B. If the fish 220 which has been swimming towards the right should suddenly dart in the opposite direction, it will be shown going slightly toward the left from a position in the right half of the screen, as depicted in FIG. 33C. Movements of the fish 220 can thus be simulated more realistically.

Figure 34A:
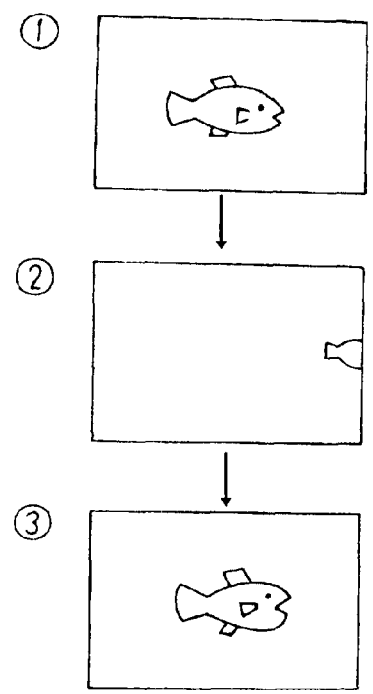
FIGS. 34A and 34B are illustrative diagrams of a method for representing rapid fish movement through camera shot layout.
Figure 34B:
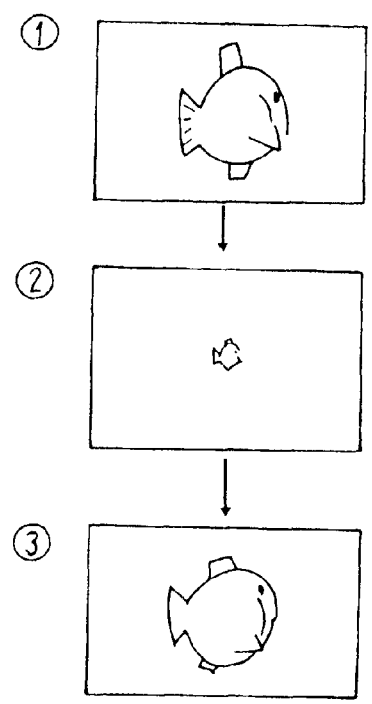

FIGS. 34A and 34B are illustrative diagrams of a method for representing rapid fish movement through camera shot layout. As described earlier, in the camera viewpoint coordinate system the line of sight is oriented towards the fish. Thus, in the event the fish should move suddenly, the line of sight of the camera simultaneously reorients towards the fish, and this makes it impossible to portray sudden motion by fish since the fish is always displayed in the center of the screen.

In order to portray sudden motion by fish, control is performed in such a way that the speed of motion of the line of sight of the camera pointed toward the fish is limited, producing a delay in reorientation of the line of sight of the camera towards a fish which has suddenly moved. FIG. 34A depicts the screens displayed when the fish darts suddenly to the right. In display screen ①, a fish which has been staying in place suddenly darts to the right, producing screen ②. ② shows a portion of the tail fin of the fish, but it would be possible to have the fish momentarily disappear as well. Once a prescribed period of time has elapsed, the fish is again shown in the center of the screen, as depicted in screen ③.

The screens displayed when the fish suddenly swims far away are depicted in FIG. 34B. Motion of the camera to catch up with the fish is delayed, so the fish is momentarily shown very small, as depicted in screen ②. This makes it possible to enhance to impression of rapid movement by a fish.

Figure 35A:
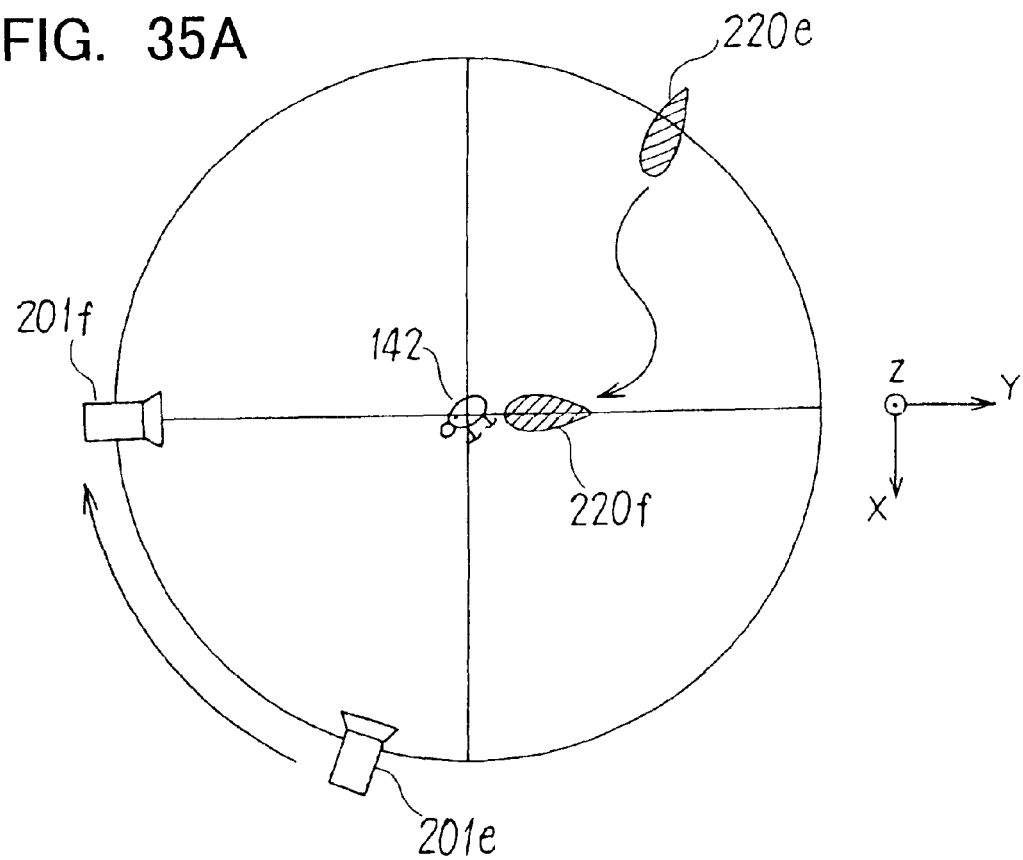
FIGS. 35A through 35C are illustrative diagrams of camera shot layout for the moment that the fish bites in an embodiment of the present invention.
Figure 35B:
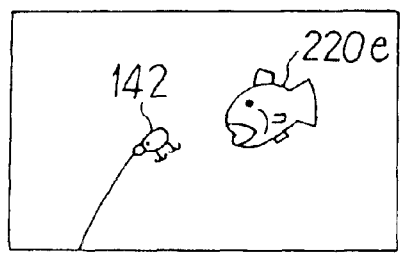
Figure 35C:
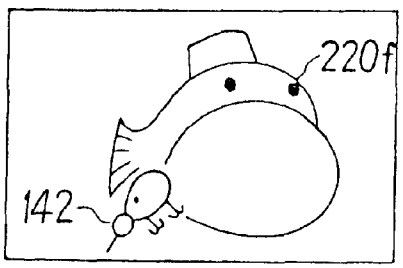

FIGS. 35A through 35C are illustrative diagrams of camera shot layout for the moment that the fish bites the lure. As depicted in FIG. 35A, prior to the fish biting, the lure 142 and the fish 220e are shown from position 201e, producing the screen depicted in FIG. 35B.

When the fish 220e circles around and bites the lure 142, the camera zooms in while swinging around to position 201f located on the opposite side of the lure 142 from the fish 220f, and then zooms out once the fish has bitten the lure. FIG. 35C depicts the screen shown just prior to zoom-in on the biting sequence. In the manner described earlier, a critical speed is established and the speed of camera motion during this time is controlled so as not to be excessively rapid. The fish may disappear momentarily from the screen. This enhances the force of the instant of biting, arousing the interest of the player.

Figure 36A:
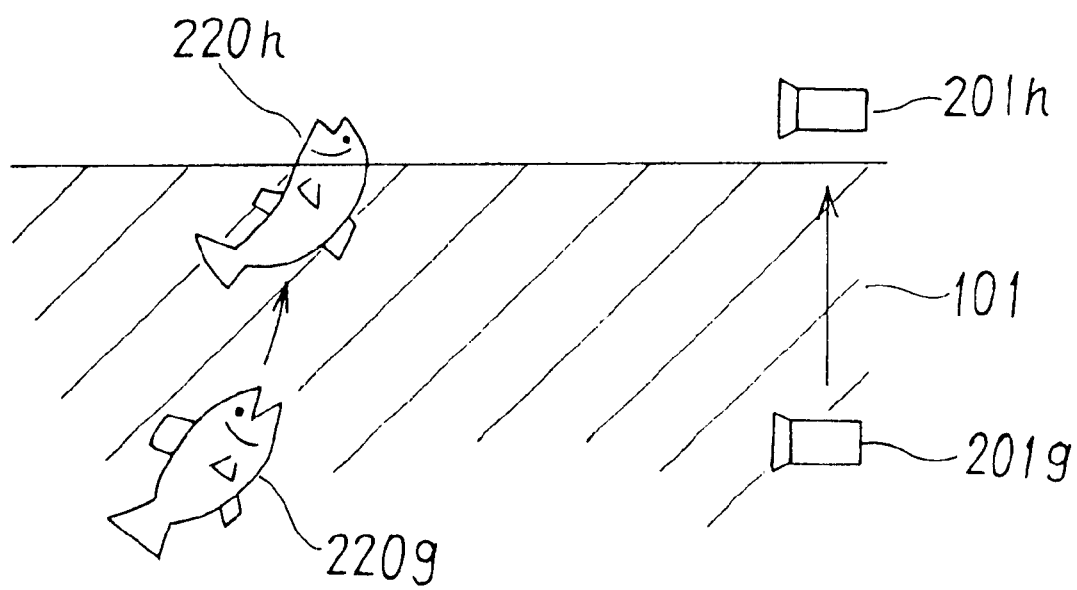
FIGS. 36A and 36B are illustrative diagrams of camera shot layout for gill washing in an embodiment of the present invention.
Figure 36B:
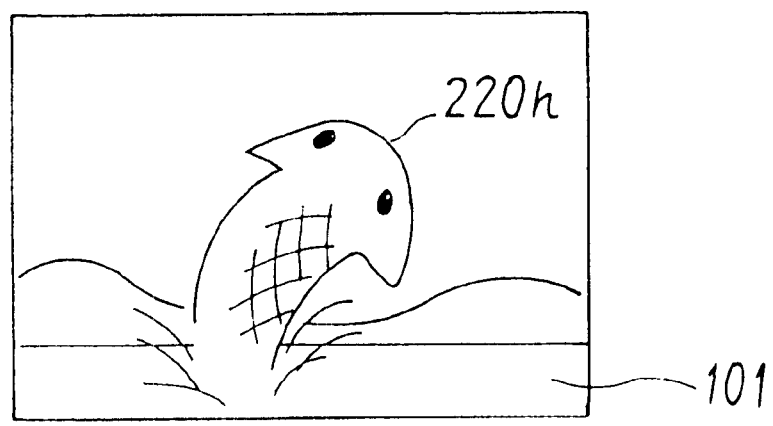

FIGS. 36A and 36B are illustrative diagrams of camera shot layout for gill washing by the fish. As depicted in FIG. 36A, the camera ordinarily shows the fish 220g viewed from position 201g located underwater in the lake. However, when the fish emerges above the surface of the water to wash its gills, as indicated by 220h, the camera also emerges to position 201h located above the surface of the water while zooming in on the fish 220h, producing the screen shown in FIG. 36B.

When a fish has been caught by the fisherman, the camera emerges above the surface of the water and moves to a viewpoint form which both fish and fisherman can be accommodated within the same screen. This enhances the impact of fishing and enhances the sense of realism experienced by the player.

According to the invention disclosed herein, the position of the fishing rod is sensed by a sensing unit provided to the main unit of the device, allowing the fishing rod to be made lighter. More realistic fish movements can be simulated by the longitudinal and transverse sensing mechanisms.

Small vibrating motions are imparted to the fishing line by the vibrating unit for imparting finely graduated motion to the fishing line, thereby transmitting to the hands grasping the fishing rod a sensation which closely approximates the resistance felt when the fish swims. By controlling the intensity and frequency of vibration, it is possible to simulate differences in resistance with fish size, the sensation of pulling a lure, the lure hitting an obstacle, or the fish biting.

Since slack is taken up by the slack uptake unit, the fishing line is kept constantly taut with respect to the fishing rod even though the fishing line is not actually attached to the reel, i.e., even though the fishing line cannot be reeled in, thereby providing a sensation simulation manipulation of lure movement.

Thus, according to the present invention, there is now provided a fishing game device, particularly a game device with a lure fishing theme, wherein manipulation of the fishing rod to impart action to the lure is sensed and tugging by the fish can be simulated more realistically, and that has a simple structure that is easy to maintain, allowing it to withstand play by a large unspecified number of players.

According to the fishing game device of the present invention, fish in the game grow day by day, with fish that have not been caught growing to become big fish. Since weight rankings for fish caught are indicated, players can enjoy beating previously established records over extended periods of time.

In the game, wind direction and water temperature in the lake vary day to day, and the place in which the fish are present changes accordingly. Thus, players do not become bored. Fish are endowed with various traits such as personality, activity, and lure preference, providing to the player excitement similar to actual fishing.

Movements of the fishing rod manipulated by the player are detected and are used to modify computer graphic screens showing in-water images, thereby providing the experience of lure fishing while allowing the player to see things not possible in reality, such as the lure and the fish underwater.

Examples of the invention were illustrated above with reference to the drawings, but these examples are merely illustrative and imply no limitation of the invention, the scope of the invention being that set forth in the Claims, with elements similar to those set forth in the accompanying Claims falling within the scope of the invention.

What is claimed is:

1. A fishing game device comprising:

a display unit;

a control unit for converting into two dimensional coordinates data for objects having three-dimensional coordinates in a three-dimensional virtual space and controlling the display of images of the objects on the display unit, said objects including a fish;

a memory component for storing data for said fish moving about within the three-dimensional virtual space;

a simulated fishing rod manipulated by a player; and a sensing element for sensing movements of the simulated fishing rod manipulated by the player, wherein the control unit establishes camera viewpoint on the basis of a specific relationship to the coordinates of the object in a three-dimensional coordinate system and controls the display unit so as to display image data produced through projection of the object, as viewed from the camera viewpoint, onto a two-dimensional plane, and wherein the object coordinates and camera viewpoint coordinates maintained in a specific relationship to the object coordinates are updated in response to movements of the simulated fishing rod sensed by the sensing element, and wherein the control unit modifies the fish data over time or in response to motion of the simulated fishing rod sensed by the sensing element and stores the modified data in the memory component.

2. The fishing game device according to claim 1, wherein the objects further include lure;

the control unit has a parameter for deciding whether the fish captures the lure; and the value of the parameter is increased or decreased with reference to signals from the sensing element sensing motion of the fishing rod manipulated by the player, the modified values being stored in the memory component.

3. A data processing method for a fishing game comprising the steps of:

converting into two-dimensional coordinates data for objects having three-dimensional coordinates in a three-dimensional virtual space, said objects including a fish;

controlling a display of images of the objects on a display unit, and a simulated fishing rod manipulated by a player;

sensing movements of the simulated fishing rod manipulated by the player;

establishing camera viewpoint on the basis of a specific relationship to the coordinates of the objects in the three-dimensional coordinates;

controlling the display unit so as to display image data produced through projection of the objects, as viewed from the camera viewpoint, onto a two-dimensional plane;

updating the object coordinates and camera viewpoint coordinates maintained in the specific relationship to the object coordinates in response to movement of the simulated fishing rod sensed in the sensing step;

storing data for said fish moving about within the three-dimensional virtual space; and modifying the fish data over time or in response to motion of the simulated fishing rod sensed by the sensing element.

4. The data processing method according to claim 3, wherein the objects further include a boat; and where the boat is to be shown from the camera viewpoint as cruising at high speed over a water surface established in the three-dimensional virtual space, the camera viewpoint is rotated by the camera view point establishing step, on a circle having a prescribed radius centered on the boat, within a horizontal plane located a prescribed height above the boat, in the step of controlling the display unit.

5. The data processing method according to claim 3, wherein where an object is to be portrayed from the camera viewpoint as rocking on a water surface established in the three-dimensional virtual space, the line of sight of the camera viewpoint is moved repeatedly over a prescribed angle as the center by the camera view point establishing step.

6. The data processing method according to claim 3, wherein where an object in water established in the three-dimensional virtual space is to be portrayed by the camera viewpoint, a line of sight of the camera viewpoint is positioned between the player and the object, and is moved within a prescribed range, centered on the object, in response to movements of the object by the camera view point establishing step.

7. The data processing method according to claim 6, wherein the line of sight of the camera viewpoint is moved with a prescribed time delay in association with movement of the object by the camera view point establishing step.

8. The data processing method according to claim 6, wherein if an object is being depicted from the camera viewpoint and the object becomes hidden by an obstacle, the line of sight of the camera viewpoint is shifted to a location from which the object is visible by the camera view point establishing step.

9. The data processing method according to claim 3, wherein the objects are a fish and lure, and where the lure and fish are to be depicted from the camera viewpoint in water established in the three-dimensional virtual space, when the fish enters a prescribed range within an area having a prescribed radius and centered on the lure, the camera viewpoint is shifted to behind the fish with respect to the lure by the camera view point establishing step.

10. The data processing method according to claim 9, wherein when the fish enters a range other than the prescribed range within the aforementioned area, the camera viewpoint is shifted to behind the lure with respect to the fish by the camera view point establishing step.

11. The data processing method according to claim 3, wherein when the fish swimming through water established in the three-dimensional virtual space approaches the camera viewpoint, the camera viewpoint is shifted, the motion thereof being limited to a prescribed angle above the fish by the camera view point establishing step.

12. The data processing method according to claim 3, wherein the objects further include a lure, and where the lure and fish are portrayed from the camera viewpoint in water established in the three-dimensional virtual space, and where the fish additionally captures the lure, the camera viewpoint, whose line of sight is oriented towards the lure, is shifted to the side of the lure opposite that where the fish is located, and is zoomed in by a prescribed magnification by the camera view point establishing step.

13. The data processing method according to claim 3, wherein when the fish swimming through water established in the three-dimensional virtual space is depicted from the camera viewpoint, and the fish additionally emerges above the surface of the water, the camera viewpoint, whose line of sight is oriented towards the fish, is emerged above the surface of the water by the camera view point establishing step.

14. The data processing method according to claim 3, wherein the objects further include a fisherman, and where the fish swimming through water established in the three-dimensional virtual space is depicted from the camera viewpoint, and the fish is hooked, the camera viewpoint, whose line of sight is oriented towards the fish, is emerged above the surface of the water, and shows on the display device an image of both fish and fisherman by the camera view point establishing step.

15. The data processing method according to claim 3, wherein the objects further include a lure, and in the event that the fish captures the lure, an indicator corresponding to a tensile force on the fishing line sensed by the sensing portion is displayed on the display device.

16. The data processing method according to claim 3, wherein an image of the fish swimming through the water is displayed on the display unit, the fish is shown at a position shifted a prescribed distance away from the center of the screen of the display unit, in the direction in which the fish advances.

17. The data processing method according to claim 3, wherein when a fish swimming through water established in the three-dimensional virtual space approaches the camera viewpoint, the position of the fish on the screen of the display device is shown above the center of the screen.

18. The data processing method according to claim 3, wherein when an object in the water and the water surface as viewed from underwater are portrayed from the camera viewpoint located underwater in water established in the three-dimensional virtual space, a shadow of the object on the surface of the water is displayed on the screen of the display device.

19. A data processing method for a game comprising the steps of:
    converting into two-dimensional coordinates data for objects having three-dimensional coordinates in three-dimensional virtual space;
    controlling a display of images of the objects on a display unit, and a simulated controller manipulated by a player;
    sensing movements of the simulated controller manipulated by the player;
    establishing a camera viewpoint on the basis of a specific relationship to the coordinates of the objects in the three-dimensional coordinates;
    controlling the display unit so as to display image data produced through projection of the objects, as viewed from the camera viewpoint, onto a two-dimensional plane; and
    updating the object coordinates and camera viewpoint coordinates maintained in the specific relationship to the object coordinates in response to movement of the simulated controller in the sensing step,
    wherein where an object established in three-dimensional virtual space is to be portrayed by the camera viewpoint, a line of sight of the camera viewpoint is positioned between the player and the object, and is moved within a prescribed range, centered on the object, in response to movements of the object by the camera viewpoint establishing step.

20. A data processing method for a game comprising the steps of:
    converting into two-dimensional coordinates data for objects having three-dimensional coordinates in three-dimensional virtual space;
    controlling a display of images of the objects on a display unit, and a simulated controller manipulated by a player;
    sensing movements of the simulated controller manipulated by the player;
    establishing a camera viewpoint on the basis of a specific relationship to the coordinates of the objects in the three-dimensional coordinates;
    controlling the display unit so as to display image data produced through projection of the objects, as viewed from the camera viewpoint, onto a two-dimensional plane; and
    updating the object coordinates and camera viewpoint coordinates maintained in the specific relationship to the object coordinates in response to movement of the simulated controller in the sensing step,
    wherein the objects include first and second objects, and where the first and second objects are to be depicted from the camera viewpoint established in the three-dimensional virtual space, when the first object enters a prescribed range within an area having a prescribed radius and centered on the second object, the camera viewpoint is shifted to behind the first object with respect to the second object by the camera viewpoint establishing step.

21. The data processing method according to claim 20, wherein when the first object enters a range other than the prescribed range within the aforementioned area, the camera viewpoint is shifted behind the second object with respect to the first object by the camera viewpoint establishing step.

* * * * *